United States Patent
Kounavis et al.

(10) Patent No.: US 7,525,962 B2
(45) Date of Patent: Apr. 28, 2009

(54) REDUCING MEMORY ACCESS BANDWIDTH CONSUMPTION IN A HIERARCHICAL PACKET SCHEDULER

(75) Inventors: Michael Kounavis, Hillsboro, OR (US); Alok Kumar, Santa Clara, CA (US); Raj Yavatkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 779 days.

(21) Appl. No.: 11/024,318

(22) Filed: Dec. 27, 2004

(65) Prior Publication Data

US 2006/0153184 A1 Jul. 13, 2006

(51) Int. Cl.
*H04L 12/28* (2006.01)

(52) U.S. Cl. ............... 370/389; 370/232; 370/390; 370/395; 370/412; 370/465

(58) Field of Classification Search .......... 370/232, 370/389, 390, 392, 395, 395.1, 395.4, 395.42, 370/412, 413, 465, 468
See application file for complete search history.

(56) References Cited

U.S. PATENT DOCUMENTS

| | | | | |
|---|---|---|---|---|
| 5,850,399 A * | 12/1998 | Ganmukhi et al. | ......... | 370/412 |
| 5,864,540 A * | 1/1999 | Bonomi et al. | ............. | 370/235 |
| 6,105,053 A * | 8/2000 | Kimmel et al. | ............. | 718/105 |
| 6,269,390 B1 * | 7/2001 | Boland | ........................ | 718/100 |
| 6,272,109 B1 | 8/2001 | Pei et al. | | |
| 6,272,517 B1 * | 8/2001 | Yue et al. | ..................... | 718/102 |
| 6,438,134 B1 * | 8/2002 | Chow et al. | ................. | 370/412 |
| 6,570,883 B1 * | 5/2003 | Wong | ......................... | 370/412 |
| 6,834,053 B1 * | 12/2004 | Stacey et al. | ............ | 370/395.4 |
| 6,937,606 B2 * | 8/2005 | Basso et al. | ................. | 370/412 |
| 6,952,696 B1 * | 10/2005 | Nadj et al. | ..................... | 707/8 |
| 7,039,054 B2 * | 5/2006 | Narad et al. | ................ | 370/392 |
| 7,039,772 B1 | 5/2006 | Zandonadi et al. | | |
| 7,209,440 B1 | 4/2007 | Walsh et al. | | |
| 7,215,678 B1 * | 5/2007 | Ahlfors et al. | ............. | 370/412 |
| 7,272,150 B2 * | 9/2007 | Bly et al. | .................... | 370/414 |
| 7,274,668 B2 * | 9/2007 | Kyusojin et al. | ............ | 370/235 |
| 7,277,448 B1 | 10/2007 | Long et al. | | |
| 7,283,532 B2 * | 10/2007 | Hassan-Ali et al. | .... | 370/395.42 |
| 7,304,944 B2 * | 12/2007 | Bitar et al. | .................. | 370/229 |
| 7,336,606 B2 * | 2/2008 | Romano et al. | ............ | 370/230 |
| 7,372,857 B1 | 5/2008 | Kappler et al. | | |
| 2002/0184381 A1 | 12/2002 | Ryan et al. | | |

(Continued)

OTHER PUBLICATIONS

Bennett, Jon C. R. and Zhang, HUI, "Hierarchical Packet Fair Queueing Algorithms," IEEE/ACM Transactions on Networking, vol. 5, No. 5, pp. 675-689, Oct. 1997.

Stocia, Ion et al., "A Hierarchical Fair Service Curve Algorithm for Link-Sharing, Real-Time and Priority Services," ACM Sigcomm Computer Communication Review, vol. 27 No. 4, pp. 249-262, Oct. 1997.

(Continued)

*Primary Examiner*—Edan Orgad
*Assistant Examiner*—Andrew C Lee
(74) *Attorney, Agent, or Firm*—Blakely, Sokoloff, Taylor & Zafman LLP

(57) ABSTRACT

Reducing memory access bandwidth consumption in a hierarchical packet scheduler. A hierarchical packet scheduler is maintained, wherein the hierarchical packet scheduler includes one or more levels, each level including one or more schedulers, wherein one or more threads serve each level. Scheduling operations are performed at each scheduler of the hierarchical packet scheduler by reading a portion of scheduler state from external memory.

22 Claims, 16 Drawing Sheets

U.S. PATENT DOCUMENTS

| | | |
|---|---|---|
| 2003/0147409 A1* | 8/2003 | Wolrich et al. ............... 370/412 |
| 2004/0081157 A1 | 4/2004 | Hassan-Ali et al. |
| 2004/0258072 A1* | 12/2004 | Deforche ................. 370/395.4 |
| 2005/0141523 A1 | 6/2005 | Yeh et al. |
| 2005/0243853 A1 | 11/2005 | Bitar et al. |
| 2006/0029079 A1* | 2/2006 | Cohen et al. ............. 370/395.4 |
| 2006/0039079 A1 | 2/2006 | Kobayashi et al. |

OTHER PUBLICATIONS

Keshav, Srinivasan, "An Engineering Approach to Computer Networking: ATM Networks, the Internet, and the Telephone Network," Addison-Wesley professional computing series, pp. 209-263, 1997, Addison Wesley Longman, Inc.

* cited by examiner

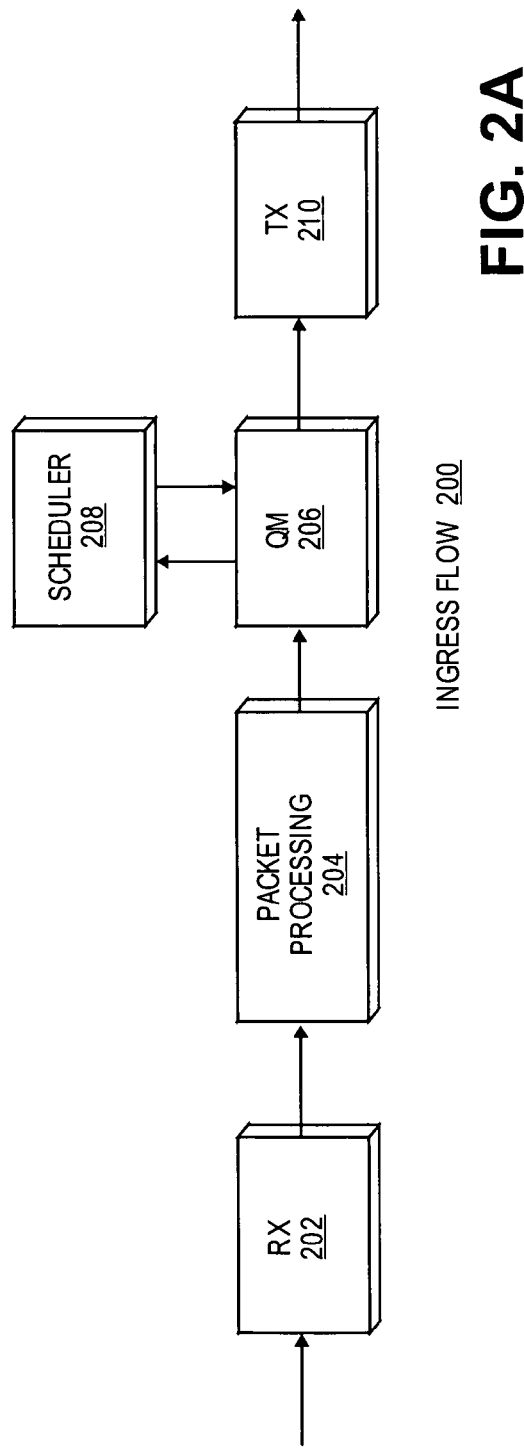
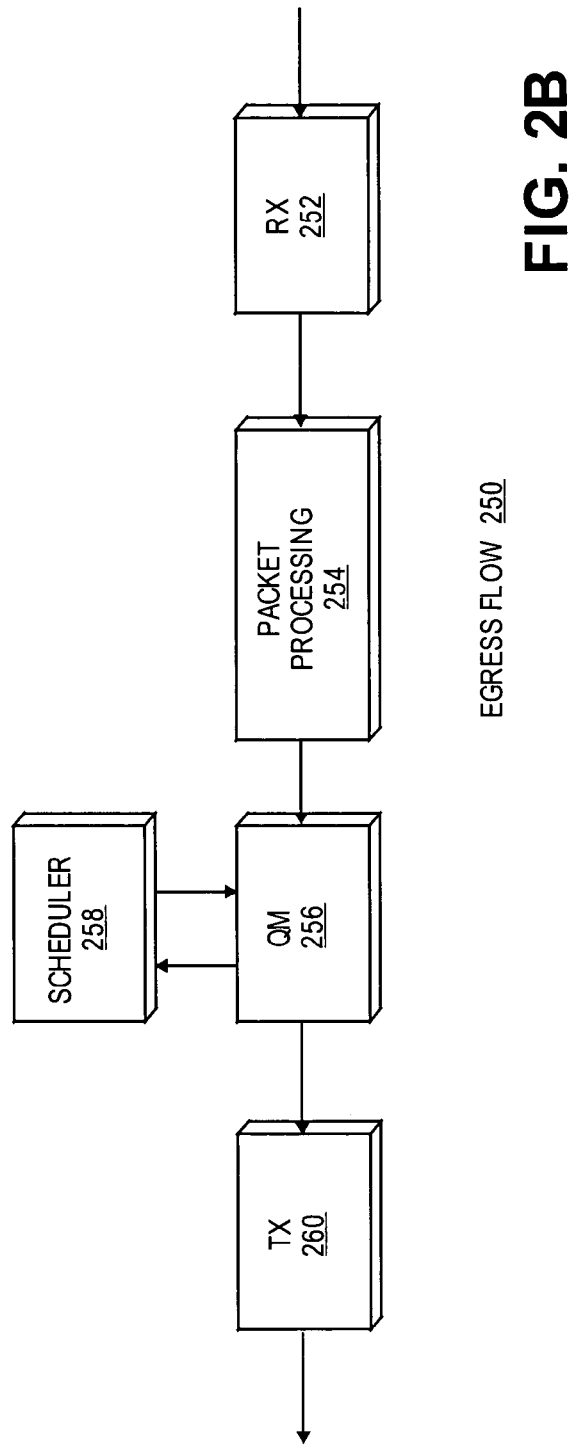

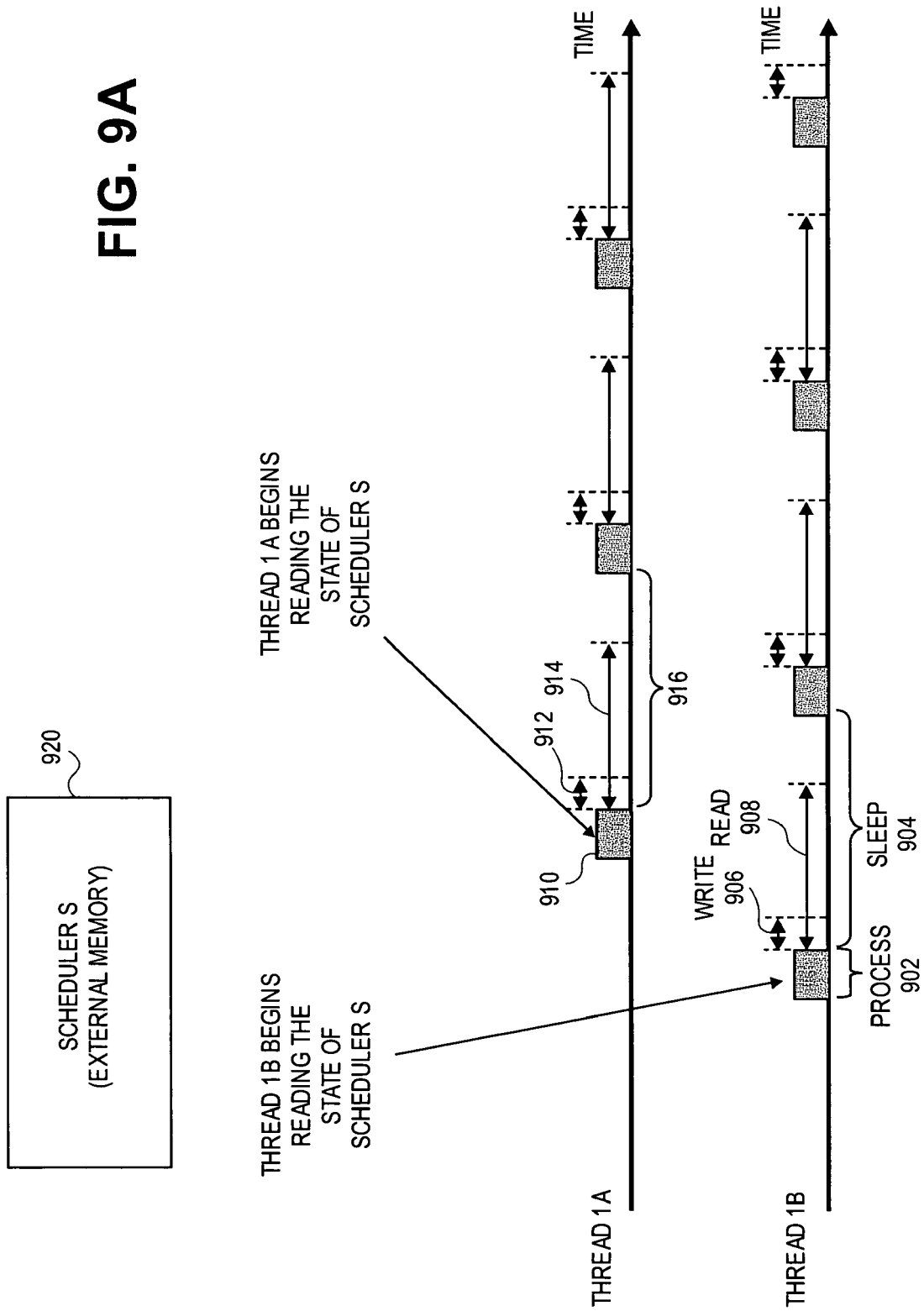

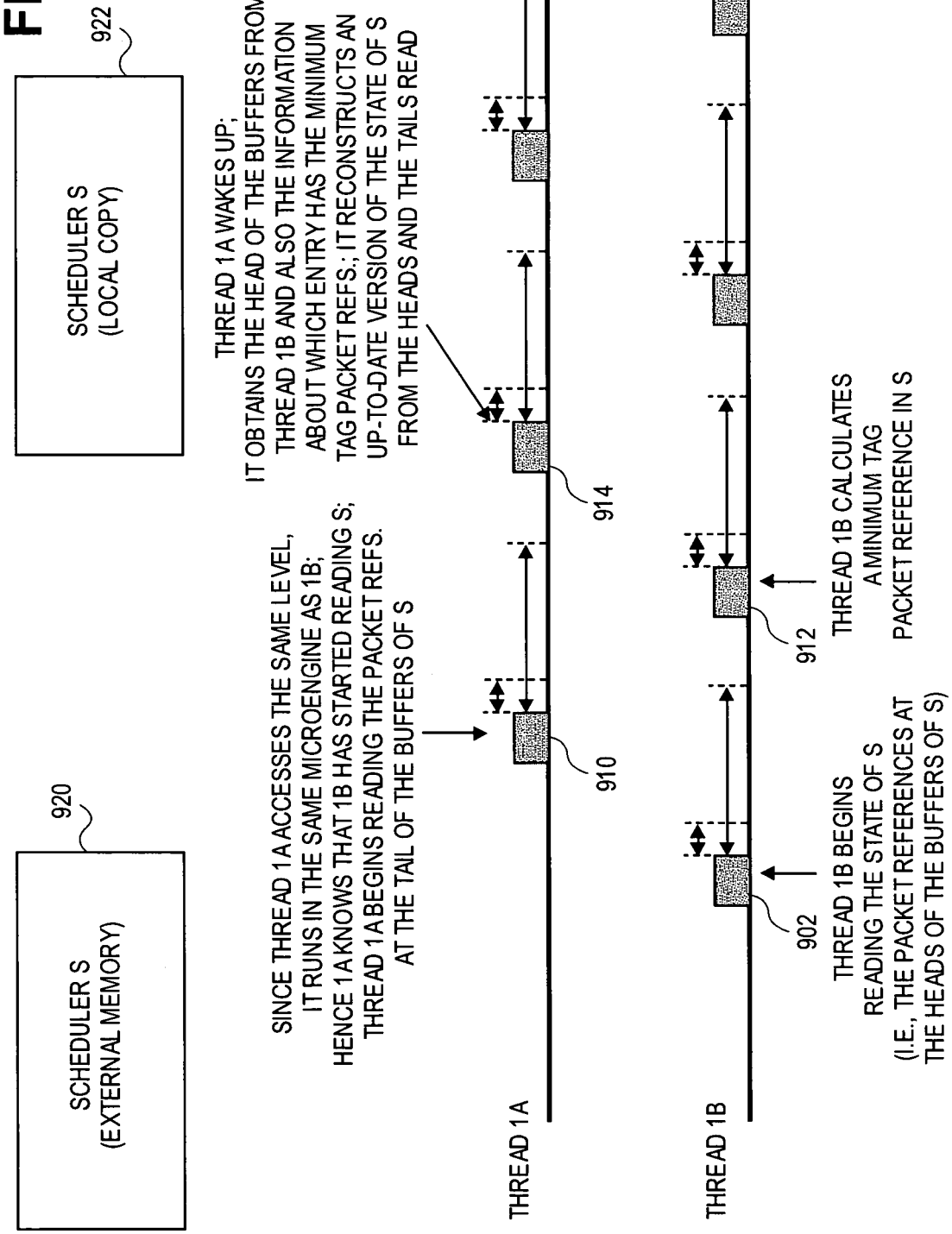

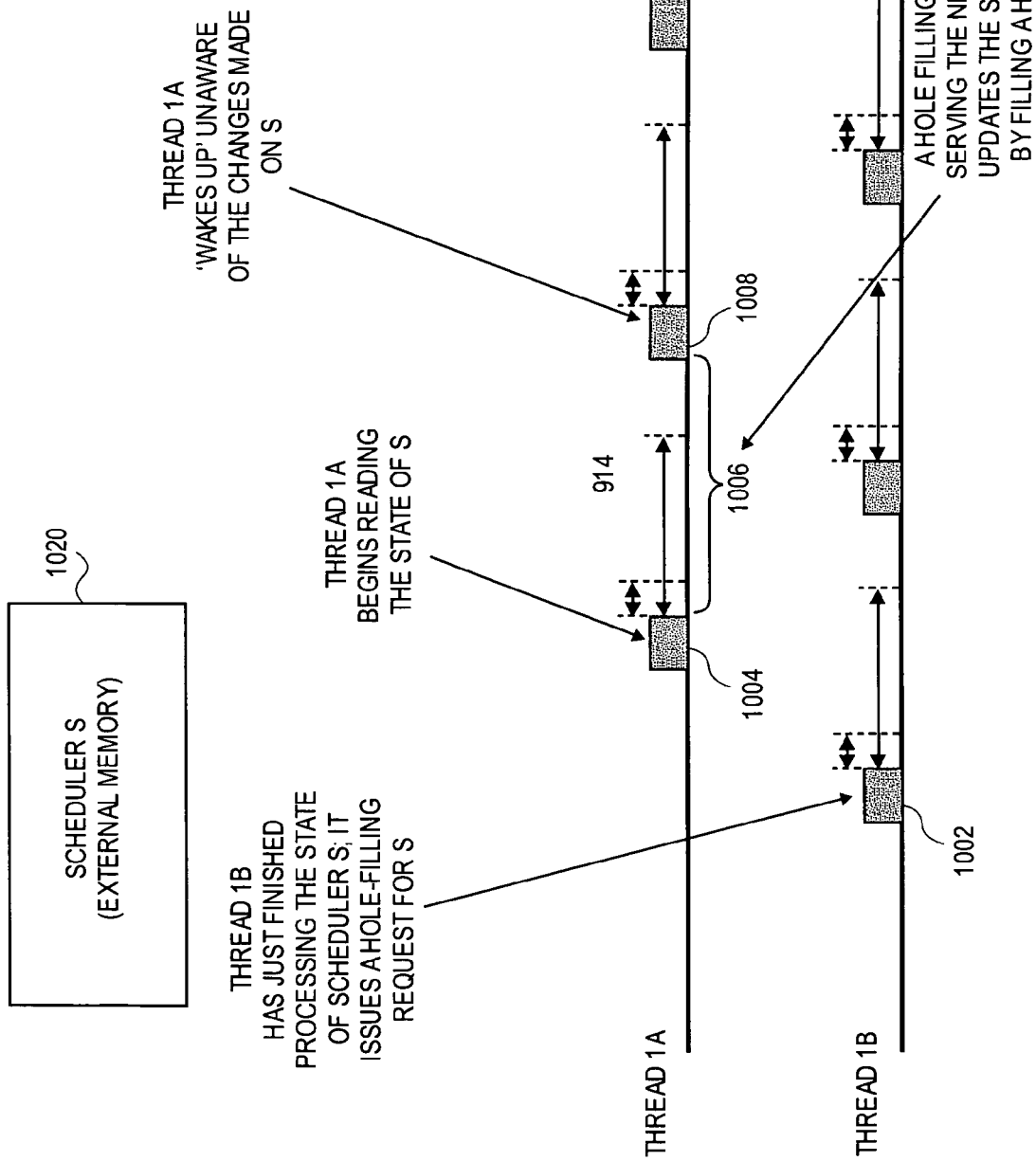

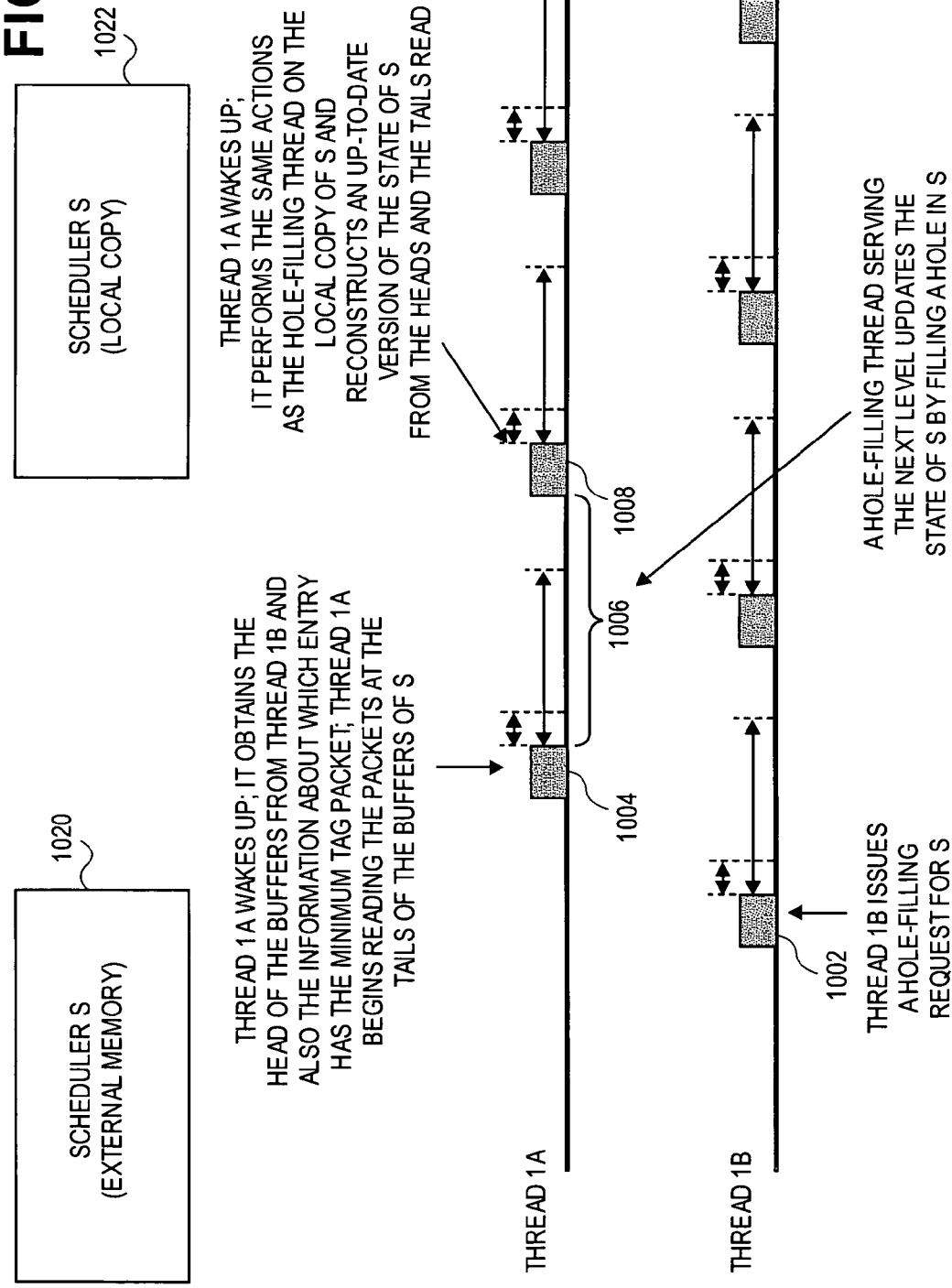

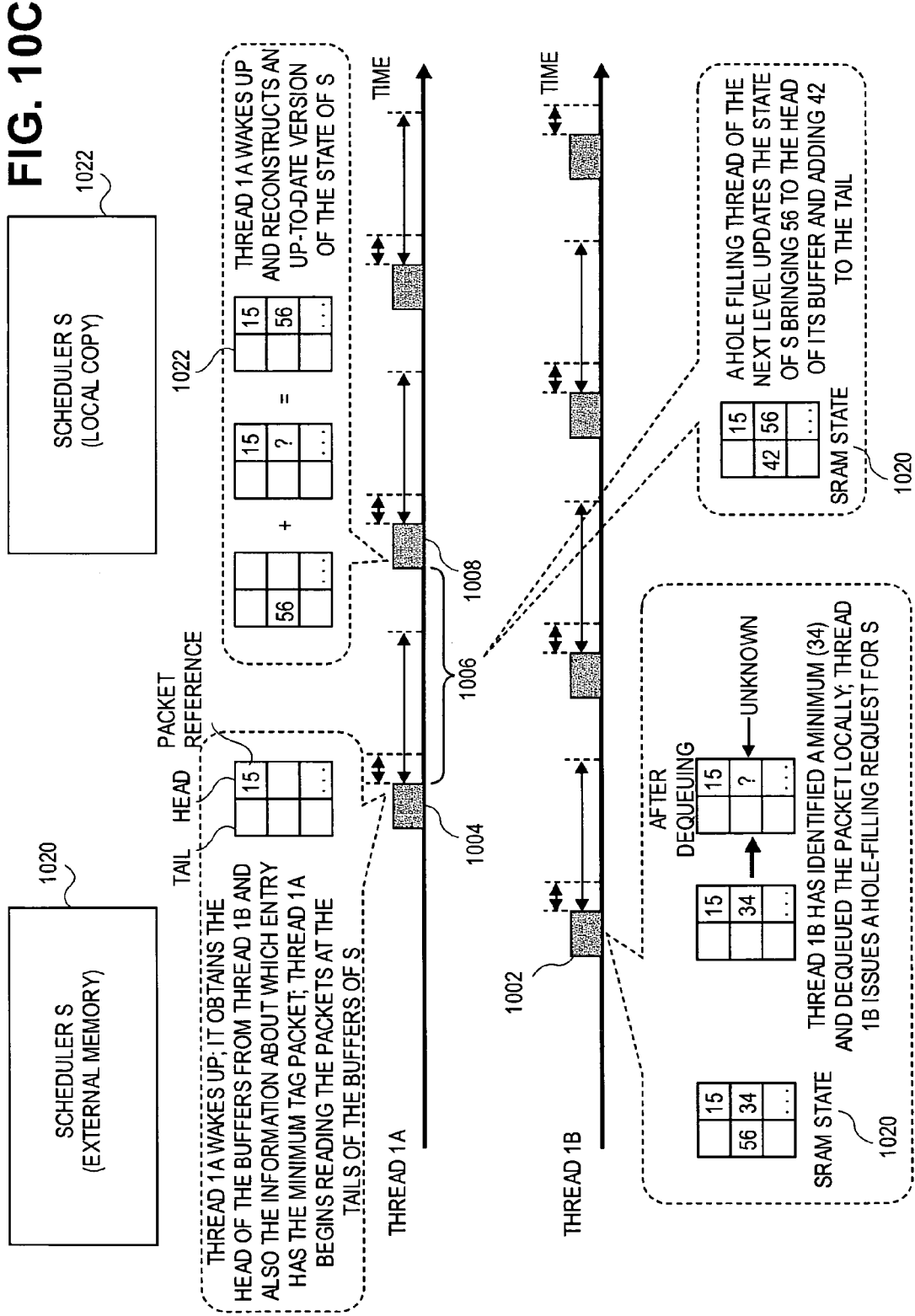

REDUCING MEMORY ACCESS BANDWIDTH CONSUMPTION IN A HIERARCHICAL PACKET SCHEDULER

CROSS-REFERENCE TO RELATED APPLICATIONS

This application is related to U.S. patent application Ser. No. 11/020,942, entitled "Hierarchical Packet Scheduler Using Hole-filling and Multiple Packet Buffering," filed Dec. 23, 2004, and currently pending.

BACKGROUND

1. Field

Embodiments of the invention relate to the field of network devices and more specifically, but not exclusively, to reducing memory access bandwidth consumption in a hierarchical packet scheduler.

2. Background Information

Networks provide the infrastructure for many forms of communication. Packets sent on networks are often handled by various network devices such as bridges, hubs, switches, and routers. Typically, a packet flow in a network is routed between routers until the packets reach their destination. At any time, there may be many packet flows traversing the network between sources and destinations. When packets enter a network device, logic within the network device schedules the packets for forwarding onto their destinations.

As bit rates across networks increase, the speed of packet flow through network devices becomes a key to transmission speed between source and destination. When a network device processes multiple packet flows at the same time, packets are scheduled to maximize the rate of flow through the network device. Many current scheduling designs fail to efficiently utilize memory of network devices.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2A is a block diagram illustrating one embodiment of an environment to support a hierarchical packet scheduler in accordance with the teachings of the present invention.

FIG. 2B is a block diagram illustrating one embodiment of an environment to support a hierarchical packet scheduler in accordance with the teachings of the present invention.

FIG. 9A is a block diagram illustrating a race condition handled by one embodiment of reducing memory access bandwidth consumption in a hierarchical packet scheduler in accordance with the teachings of the present invention.

FIG. 9B is a block diagram illustrating one embodiment of reducing memory access bandwidth consumption in a hierarchical packet scheduler in accordance with the teachings of the present invention.

FIG. 10A is a block diagram illustrating a race condition handled by one embodiment of reducing memory access bandwidth consumption in a hierarchical packet scheduler in accordance with the teachings of the present invention.

FIG. 10B is a block diagram illustrating one embodiment of reducing memory access bandwidth consumption in a hierarchical packet scheduler in accordance with the teachings of the present invention.

FIG. 10C is a block diagram illustrating one embodiment of reducing memory access bandwidth consumption in a hierarchical packet scheduler in accordance with the teachings of the present invention.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Hierarchical Packet Scheduler

Figure 1:
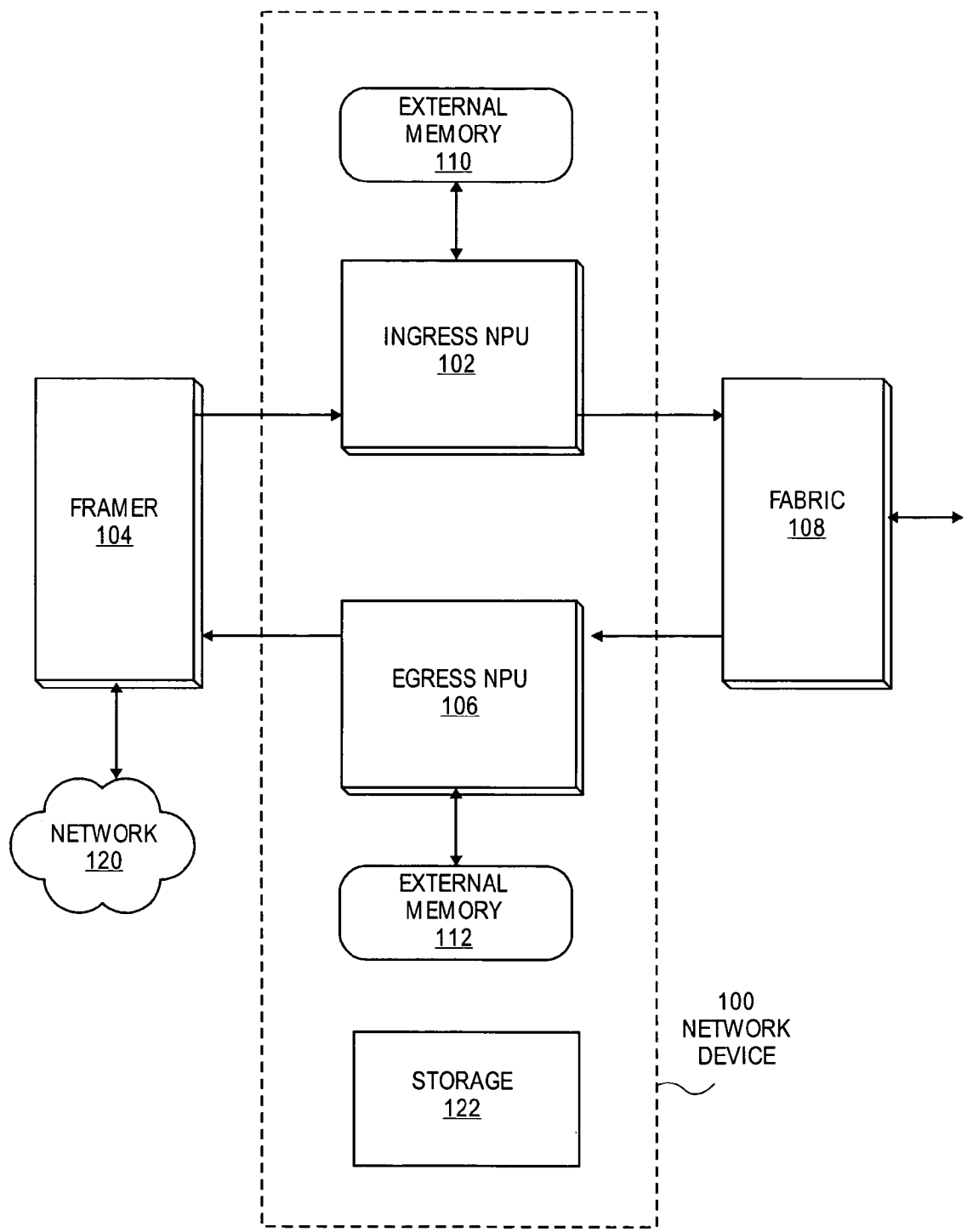
FIG. 1 is a block diagram illustrating one embodiment of an environment to support a hierarchical packet scheduler in accordance with the teachings of the present invention.

Referring to FIG. 1, an embodiment of a system to implement a hierarchical packet scheduling is shown. A network device 100 includes a router, a switch, or other device for receiving and forwarding network traffic. In one embodiment, network device 100 includes a line card. It will be understood that implementations of embodiments of the present invention are not limited to the embodiment of FIG. 1.

Network device 100 includes an Ingress Network Processing Unit (NPU) 102 and an Egress NPU 106. Ingress NPU 102 is coupled to external memory 110 and Egress NPU 112 is coupled to external memory 112. The term "external memory" refers to memory resources outside of the NPUs.

Network device 100 may also include a storage device 122 for storing instructions, such as an application, executable by Ingress NPU 102 or Egress NPU 106. Storage device 122 includes volatile and non-volatile storage. In one embodiment, instructions to support a hierarchical packet scheduler as described herein are stored in storage device 122.

Ingress processing conducted by NPU 102 includes classification, metering, policing, congestion avoidance, statistics, and segmentation. Egress processing conducted by NPU 106 includes reassembly, congestion avoidance, statistics, and traffic shaping. External memory 110 and 112 include Static Random Access Memory (SRAM), Dynamic Random Access Memory (DRAM), or the like. A Framer 104 interfaces with Ingress NPU 102 and Egress NPU 106. Framer 104 sends and receives network traffic from network 120. In one embodiment, Framer 104 interfaces with optical network traffic such as Synchronous Optical Network (SONET) traffic. Ingress NPU 102 and Egress NPU 106 are also coupled to a Fabric 108. Fabric 108 may connect Ingress NPU 102 and Egress NPU 106 to each other and other network devices. In one embodiment, Fabric 108 includes a fabric interface chip.

Turning to FIGS. 2A and 2B, embodiments of ingress flow 200 and egress flow 250 are shown. FIGS. 2A and 2B show high level logic components called microblocks. In one embodiment, the microblocks correspond to software applications or other instructions executable by a machine. In one embodiment, at least a portion of the microblocks of FIG. 2A are executed by Ingress NPU 102 and at least a portion of the microblocks of FIG. 2B are executed by Egress NPU 106. In one embodiment, the handling of packets by the ingress flow 200 and egress flow 250 occur in the fast path.

Ingress flow 200 begins at receive microblock 202. In one embodiment, multiple packet flows are received at Receive microblock 202 corresponding to multiple input ports of the network device. When received at the network device, the packets may initially by placed in receive buffers. The Receive microblock 202 may move the packet payload from receive buffers to DRAM, such as external memory 110. Ingress flow 200 manipulates packet references, such as header information, packet metadata and/or other packet information. The packet payload will be married back with the packet reference upon transmission. In one embodiment, Receive microblock 202 receives Ethernet packets, while in another embodiment Receive microblock 202 receives Packets Over SONET (POS).

In one embodiment, packet processing, queuing, and scheduling is done by manipulating packet references, such as packet headers, packet metadata, or the like, and not through the manipulation of an entire packet including its payload. The term "packet reference" used herein describes an entity representing a packet. This entity may include a pointer to a packet, a portion of the packet (e.g., header or payload), metadata associated with a packet, or the entire packet itself. Further, as used herein, "packet flow" refers to a plurality of packets associated in some manner. For example, packets in the same packet flow may be from the same source and addressed to the same destination.

Ingress flow 200 then proceeds to Packet Processing 204 for packet classification and routing. After packet processing, flow 200 proceeds to Queue Manager (QM) 206 and scheduler 208. Scheduler 208 schedules packets for transmission from ingress processing 200. In one embodiment, scheduler 208 implements a hierarchical packet scheduler as described herein.

QM 206 processes enqueue and dequeue requests made from stages of ingress processing 200. As used herein, "enqueuing" involves placing a packet into a queue or similar structure. "Dequeuing" refers to removing a packet from a queue or similar structure.

Transmit microblock 210 handles the movement of data from external DRAM to the transmit buffers. Transmit microblock 210 receives transmit requests from QM 206. The transmit requests are made using the scheduler 208 and according to the bandwidth division policies specified by the scheduler 208.

FIG. 2B illustrates one embodiment of an egress flow 250. Egress flow 250 operates similarly to ingress flow 200. Egress flow 250 may process one or more packet flows for a corresponding one or more output ports of the network device. Packet flow is received at Receive microblock 252 and then proceeds to Packet Processing 254. Egress flow then proceeds to QM 256 and Scheduler 258. Egress flow 250 then proceeds to Transmit microblock 260 for transmission.

Figure 3:
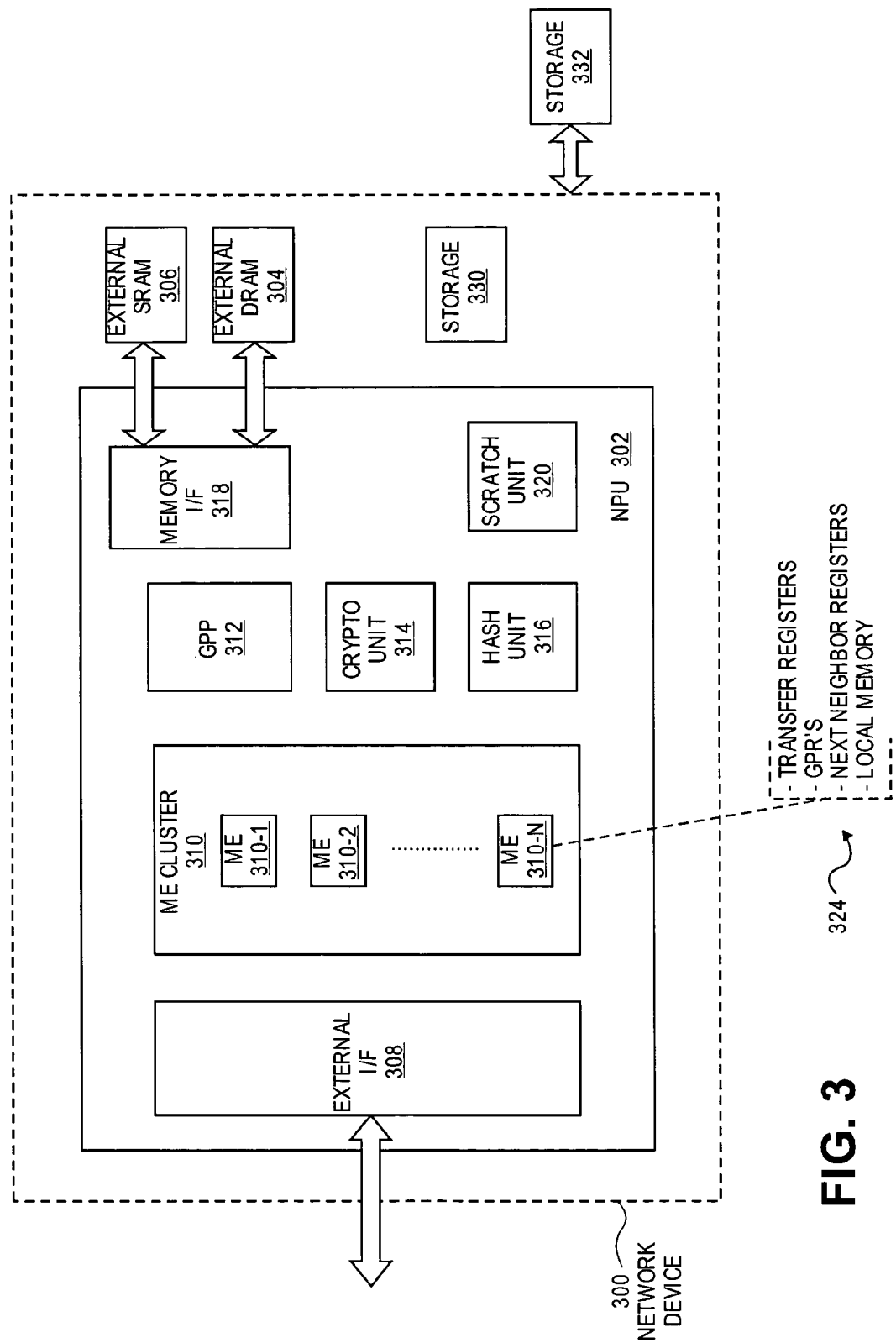
FIG. 3 is a block diagram illustrating one embodiment of an environment to support a hierarchical packet scheduler in accordance with the teachings of the present invention.

Referring to FIG. 3, an embodiment of a network device 300 is shown. It will be understood that various components of network device 300 are not shown for the sake of clarity. Further, it will be understood that components of network device 300 are connected by one or more buses or other connections, but these are not shown for clarity. Network device 300 includes an NPU 302 coupled to external DRAM 304 and external SRAM 306 by a memory interface 318. In one embodiment, NPU 302 includes, but is not limited to, an Intel® IXP (Internet eXchange Processor) family processor such as the IXP 4xx, IXP 12xx, IXP24xx, IXP28xx, or the like. It should be understood that other embodiments of network device 300 may comprise more than one NPU connected to the same or other types of memory (e.g., cache memory).

In one embodiment, network device 300 may include one or more storage devices 330 storing instructions executable by NPU 302. In another embodiment, network device 300 may receive instructions from one or more storage devices 332 that may communicate with network device 300. For the purposes of the specification, a machine-accessible medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-accessible medium includes, but is not limited to, recordable/non-recordable media (e.g., read only memory (ROM), static or dynamic random access memory (RAM), cache memory, magnetic disk storage media, optical storage media, a flash memory device, etc.).

NPU 302 may include an external interface 308 to connect network device 300 to a framer and/or a fabric. In other embodiments, the NPU may include more than one external interface. NPU 302 may also include one or more processing units. NPU 302 includes a microengine (ME) cluster 310 that includes N microengines 310-1 to 310-N. It will be understood that other types of processing units, such as a General Purpose Processor, may be employed in NPU 302 and embodiments herein are not limited to microengines.

The MEs may operate in parallel and may each provide multiple threads for packet processing. In one embodiment, the MEs are pipelined to operate on one or more packet flows concurrently. In one embodiment, ME cluster 310 includes 16 MEs of the IXP2800 network processor. In other embodiments the number and type of MEs may differ.

In one embodiment, each ME includes registers, such as registers 324 of ME 310-N. Such registers may include Transfer Registers for transferring data to and from the ME locations external to the ME, such as external SRAM 306. Such registers may also include Next Neighbor Registers to pass information between MEs. Each ME may also include General Programming Registers (GPRs). In yet another embodiment, each ME may include Local Memory. Local Memory addressing may be computed at programming run-time, while register addressing is determined at compile time and bound to the compiled instructions executed on the ME.

NPU 302 may include a General Purpose Processor (GPP) 312. In one embodiment, GPP 312 is based on the Intel XScale® technology. In another embodiment, NPU 302 may include more than one GPP. A GPP may include the same processing architecture as an ME or may have a different architecture from the MEs. NPU 302 may also include a Cryptography (Crypto) Unit 314 to perform authentication and encryption. A Hash Unit 316 may be capable of performing 48-bit, 64-bit, or 128-bit polynomial division. Scratch Unit 320 may include a Scratchpad memory. In one embodiment, Scratchpad memory includes 16 Kilobytes (KB) of memory with a memory frequency of 700 Megahertz (MHz).

Figure 4A:
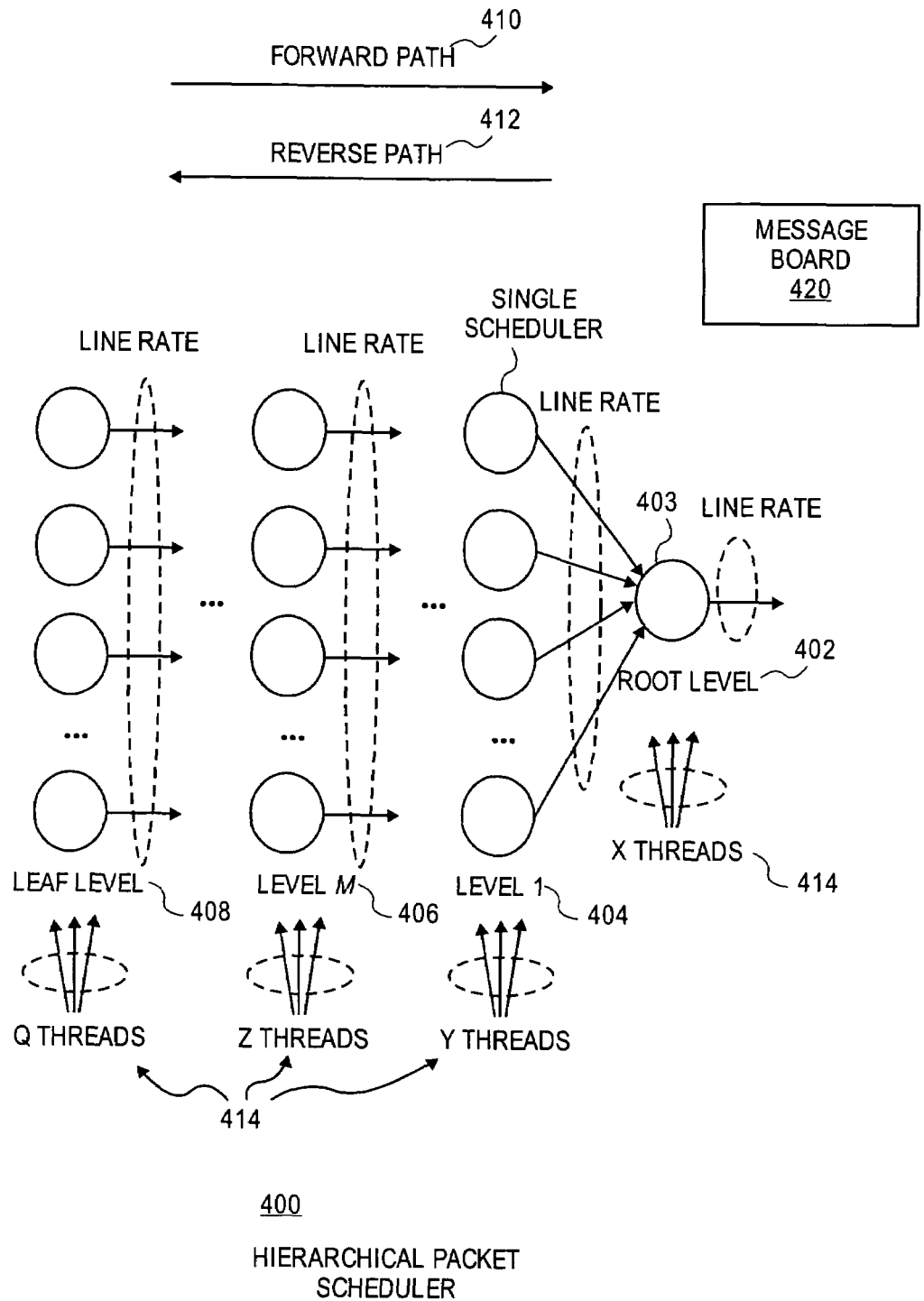
FIG. 4A is a block diagram illustrating one embodiment of an environment, where threads execute in parallel, supporting a hierarchical packet scheduler in accordance with the teachings of the present invention.

Referring to FIG. 4A, an embodiment of a hierarchical packet scheduler 400 is shown. As will be discussed below, hierarchical packet scheduler 400 provides packet scheduling by performing dequeuing operations at the root level without waiting for hole-filling operations from the lower levels complete. Embodiments of "hole-filling" will be discussed below. Further, embodiments herein use multiple packet buffering at each scheduler in the hierarchy to ensure packet references may be fed toward the root level at line rate and may be outputted from the root level at line rate. Embodiments of "multiple packet buffering" will be discussed below.

Hierarchical packet scheduler 400 includes a root level 402 having a single-level scheduler 403 (also referred to herein as the root level scheduler). The next level from the root level 402 is level 1, shown at 404. Hierarchical packet scheduler 400 includes additional levels, such as level M shown at 406, down to leaf level 408. Each level is served by one or more threads, as shown at 414. The threads include threads of microengines (MEs) and General Purpose Processors (GPPs) as discussed in conjunction with FIG. 3. In one embodiment, scheduler 400 may have 4 or 5 levels and thousands of schedulers. It will be understood that the structure of scheduler 400 is a tree structure, however, not all schedulers and their connections are shown for the sake of clarity. The term "single-level scheduler" is used herein to refer to a node of the tree structure of the hierarchical packet scheduler.

Further, the terms "parent scheduler" and "child scheduler" are used herein to refer to a relationship between single-level schedulers that are on two different levels of the hierarchy. The scheduler on the previous level is considered the parent. The term "previous level" refers to the level which is closer to the root scheduler compared to another level. The term "child scheduler" refers to a scheduler on the next level that feeds packet references into a parent scheduler along a "forward path" of packets. The term "next level" refers to a level which is further from the root scheduler compared to another level. It will be understood that the root level scheduler may be a parent scheduler, but may not be a child scheduler. Also, a forward path 410 describes a flow from the leaf to the root level, while a reverse path 412 describes a flow from the root to the leaf level.

Root level scheduler 403 outputs packets at line rate. Line rate includes the speed of the physical connection. In one embodiment, the line rate is Optical Carrier-level 48 (OC-48) which is approximately 2.5 Gigabits per second (Gbps). In another embodiment, line rate is OC-192 which is approximately 10 Gbps. Further, packets are passed from the leaf level to the root level at line rate. Packets are exchanged between levels at line rate.

Each level of hierarchical packet scheduler 400 is served by threads. In general, a thread includes a sequence of associated instructions. A single ME or GPP may execute more than one thread at a time. It is noted that according to embodiments herein each thread serves an entire level of the hierarchy, as opposed to a particular single-level scheduler. Also, there are not necessarily the same number of threads serving each level. The number of threads allocated to each level is an implementation consideration that will be discussed further below.

Threads serving hierarchical packet scheduler 400 may communicate with each other. In one embodiment, message boards, such as message board 420, are used for communications between thread serving adjacent levels in the hierarchy. Messages written by the root level scheduler 403 indicate which scheduler at the previous level in the hierarchy should provide head-of-line packets when needed. Similarly, a scheduler at level 1 uses a message board, not necessarily the same as the message board 420, to request a packet from a scheduler at level 2. Processing units within an NPU, such as MEs and GPPs, as described herein may offer a variety of methods for inter-thread and inter-microengine message board communication. Such methods include, but are not limited to, inter-thread signaling, fast on-chip memory (memory which is local to an ME or GPP), cache memory, IXP next neighbor registers, or the like. Message boards may be stored in Next Neighbor Registers or in Local Memory. In short, threads are assigned to serve each entire level of the hierarchical packet scheduler 400. Packet references are exchanged between levels at an aggregate rate which is equal to the line rate. Threads are not assigned to any one particular single-level scheduler in the hierarchy but to an entire level.

There are several types of threads serving the levels of the hierarchical packet scheduler 400. First, "dequeuing" threads forward packets from the root level to the network or some other entity such as a switch fabric. Second, "enqueuing" threads take new incoming packets and place them in schedulers in the hierarchy. These new packets are sorted inside single-level schedulers based on assigned tags. Each tag, also referred to as 'time stamp' in this document, indicates the order that packets are to be forwarded from a child single-level scheduler to a parent single-level scheduler or from the root scheduler of the hierarchical packet scheduler to the network or some other entity such as a switch fabric. In one embodiment, new packets are enqueued from one or more queues in external SRAM that are maintained by a Queue Manager.

Third, "hole-filling" threads at each level move packets up from lower levels in parallel. The term "hole-filling" is used herein to refer to a procedure of moving packets from schedulers of a next level into a scheduler of a previous level. The term "hole" refers to an empty packet space in a scheduler. A hole is created in a scheduler when a packet is moved toward the root level in the hierarchy, such as from level 2 to level 1. As will be discussed further below, a hole-filling thread patrols a particular level of the hierarchical scheduler responding to a message board indicating that a single-level scheduler has a hole that needs to be filled. A hole-filling thread fills the hole by inserting a packet from the next level. This creates another hole at the next level that is filled by a hole-filling thread serving this next level. In this way, packets are continuously fed up to the root level.

It is noted that the hole-filling threads work in parallel to complete hole-filling tasks. The hole-filling operations are parallel in that a hole-filling thread fills a hole in a parent scheduler, leaves a message regarding a hole created in the child scheduler, and moves on to another hole-filling task. The hole-filling thread does not wait for the hole in the child scheduler to be filled, but moves on to other hole-filling tasks on its assigned level of the hierarchy. The hole-filling thread knows a hole-filling thread on the child scheduler's level will take care of the hole in the child scheduler. Thus, hole-filling threads on different levels complete assigned tasking on their respective levels without delay. This parallelism enables the hierarchical packet scheduler to maintain a line rate output of packet references.

In one embodiment, multiple packet buffering may be used at each scheduler to cope for the fact that fetching scheduler state information from external memory units may take more time than the headroom associated with a particular processor architecture and line rate. Having multiple packet references in each buffer provides more time for memory access. Further, multiple hole-filling requests to the same buffer may be served by multiple independent hole-filling threads serving the same level.

Figure 4B:
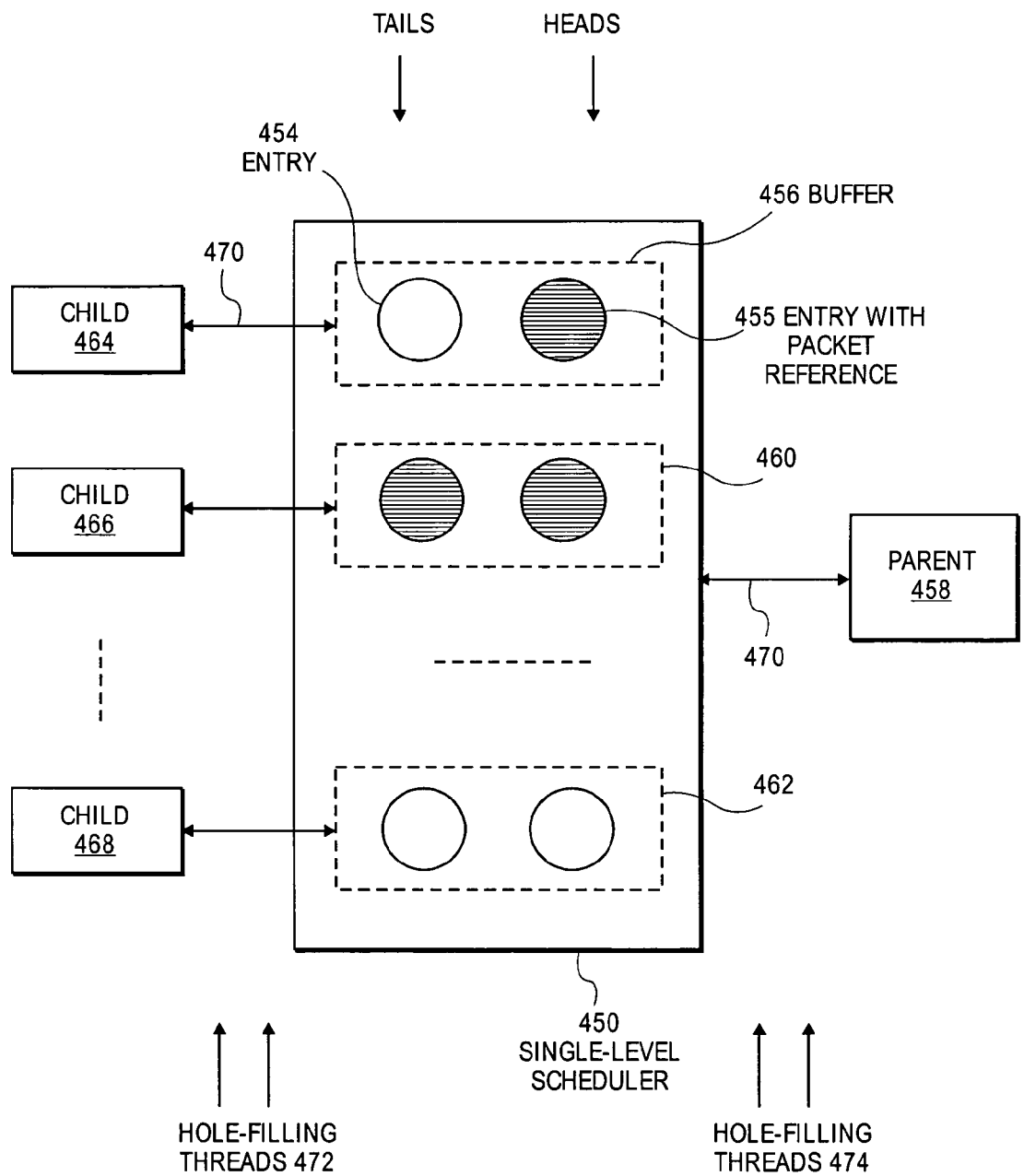
FIG. 4B is a block diagram illustrating one embodiment of a single-level scheduler that supports a hierarchical packet scheduler in accordance with the teachings of the present invention.

Turning to FIG. 4B, an embodiment a single-level scheduler 450 using two-entry buffers is shown. In scheduler 450, a buffer 456 includes entries 454 and 455. One of the entries is a tail and the other is a head of buffer 456. Entry 454 is empty and may be considered a hole, while entry 455 contains a packet reference. Buffer 460 is full and buffer 462 is empty. In one embodiment, when the head of a buffer is moved to its parent scheduler, the packet reference in the tail of the buffer is slid to the head of the buffer.

Buffer 456 is connected to child scheduler 464, buffer 460 is connected to child scheduler 466, and buffer 462 is connected to child buffer 468. Thus, single-level scheduler 450 is a parent scheduler to child schedulers 464, 466, and 468 at the next level. Scheduler 450 is also connected to its parent scheduler 458. Thus, single-level scheduler 450 is a child scheduler of parent scheduler 458 at the previous level. In one embodiment, scheduler 450 has associated 8 buffers corresponding to 8 connections to 8 child schedulers. In other embodiments the number of buffers per scheduler may differ. The forward path of a packet reference may be described by a connectionID, shown at 470.

Figure 4C:
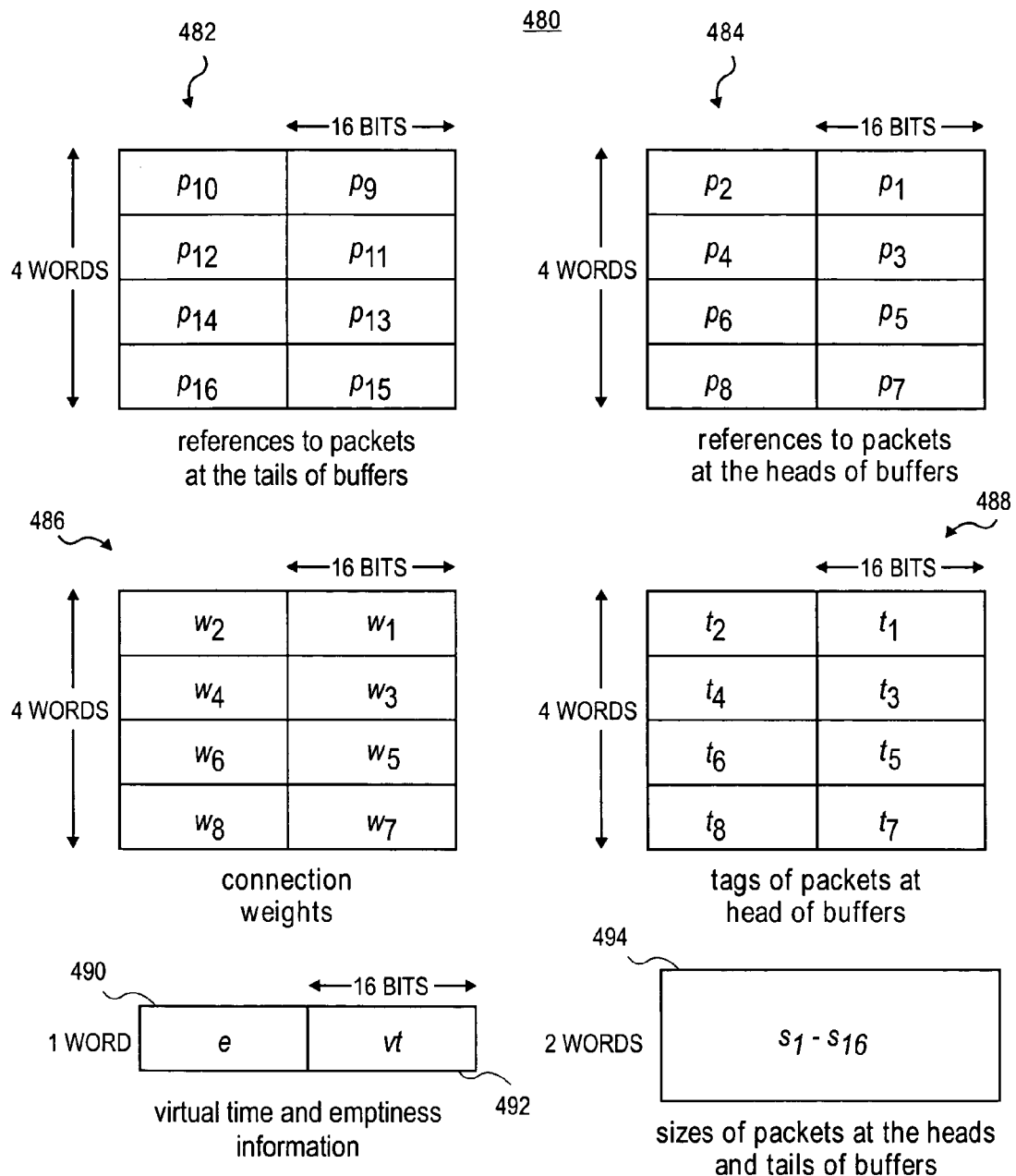
FIG. 4C is a block diagram illustrating a single-level scheduler state structure used for supporting a hierarchical packet scheduler in accordance with the teachings of the present invention.

Referring to FIG. 4C, an embodiment of a data structure 480 describing the state of each single level scheduler is shown. In one embodiment, the scheduler data structures are maintained in external SRAM. In other embodiments, other types of memory may be used. The discussion of data structure 480 includes field lengths for implementation on an IXP 2800 where a word is 32-bits long. However, it will be understood that alternative embodiments of data structure 480 may be implemented to complement other processors.

Packet references, such as pointers, at the tail of buffers, p10-p15, are shown at 482 and the corresponding packet references at the head of buffers, p1-p8, are shown at 484. Thus, each scheduler maintains information in 8 buffers, with two packets per buffer, for a total of 16 packets. Each packet reference is 16-bits long. Further, packet sizes, s1-s16, as shown at 494, are quantified as multiples of 128 bytes.

Tags of packets at the heads, t1-t8, as shown at 488, are represented using 16 bits. In this embodiment, the tags of the packets in the tails are not stored. The tags of the tails may be computed when the packet is forwarded from the tail to the head of its buffer. In another embodiment, for each two-packet buffer in each scheduler, both the tags of the packet references at the head and tail of the buffer may be stored.

Connection weights, w1-w7, as shown at 486, are represented by 16 bits. In one embodiment, connections weights describe the distribution of bandwidth of the connections between schedulers.

The schedulers current virtual time, vt, as shown at 492, is 16-bits long, and the schedulers emptiness information, e, is shown at 490. In one embodiment the current virtual time is defined as the tag of the packet which is currently being transmitted. In another embodiment, virtual time is the tag of the last packet which has been previously transmitted if no packet is currently sent to the network. "Emptiness information" refers to a collection of bits, where each bit is associated with one distinct scheduler entry. If one particular bit of e is equal to one, then this means that a packet reference is stored in this bit's associated entry. Otherwise the entry is empty.

Thus, the state of a single scheduler as defined by data structure 480 includes 19 words. 4 words for packet references, 4 words for packet tags, 4 words for connection weights, 2 words for packet sizes, and 1 word for virtual time and emptiness information.

Figure 5:
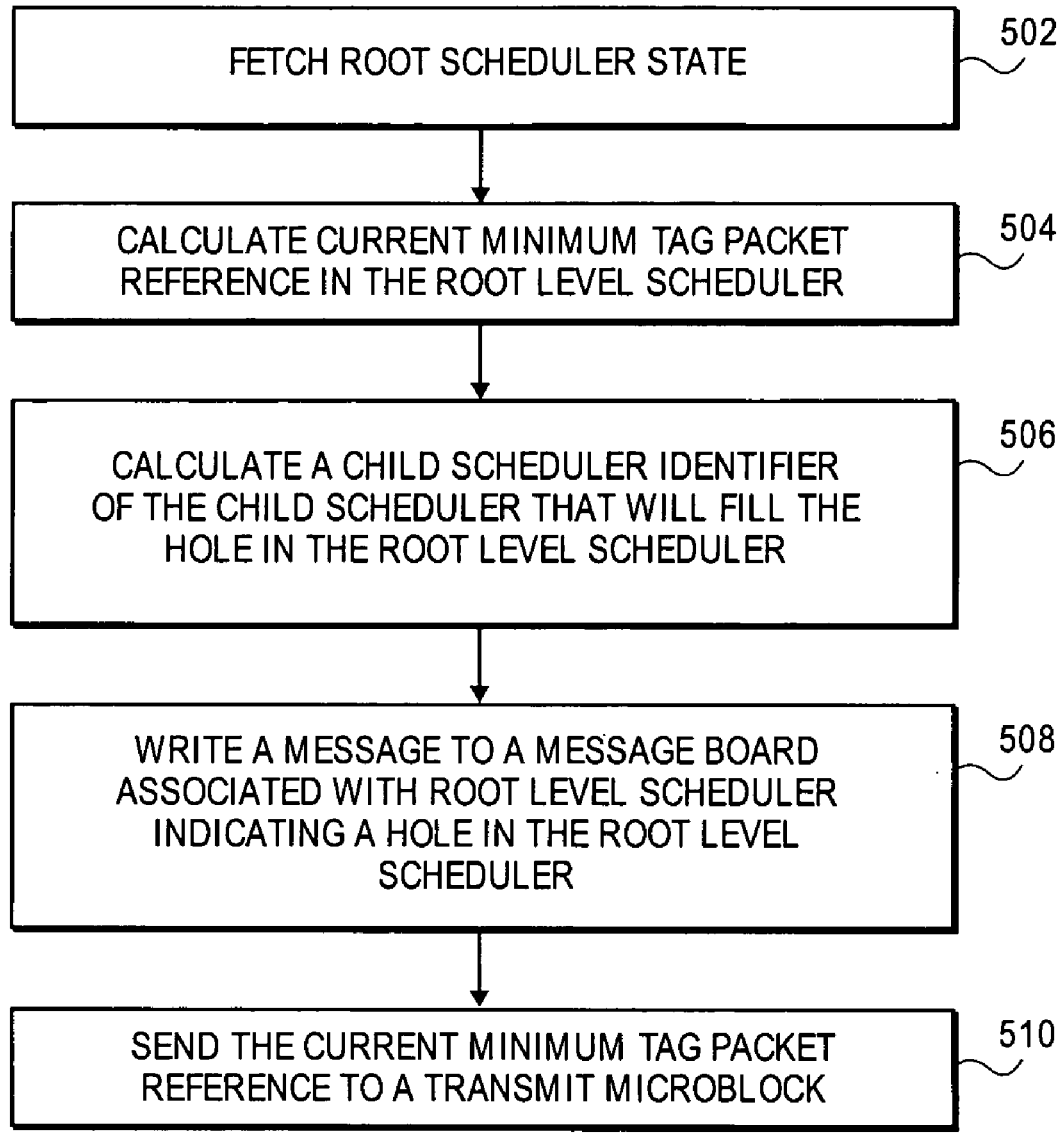
FIG. 5 is a flowchart illustrating one embodiment of the logic and operations of a dequeuing thread of a hierarchical packet scheduler in accordance with the teachings of the present invention.

Turning to FIG. 5, an embodiment of a flowchart 500 for a dequeuing thread is shown. Beginning in a block 502, the state of the root scheduler is fetched. The state information may include information concerning packet reference tags. In one embodiment the state of a single-level scheduler includes information about the absence or presence of packets in the buffers of the scheduler, references to packets, packet size values for all packets stored in the buffers of the scheduler, time stamp values for all packets, and "connection weight" values associated with each buffer of the single-level scheduler. Connection weights are numbers which specify bandwidth division policies. In other embodiments, a single-level scheduler state may include a subset of this information. This amount of state may be stored in fast memory or local registers.

Proceeding to a block 504, the current minimum tag packet reference in the root level scheduler is calculated. In one embodiment, comparisons on the tags of all the packet references in the heads of the scheduler buffers are made and the packet reference with earliest timestamp is identified as the current minimum tag packet reference.

Continuing to a block 506, the identifier of the child scheduler that contains the packet reference that will fill the hole made by sending the current minimum tag packet reference in the root level scheduler is calculated. In another embodiment, the identifiers of all child schedulers of the root level may be stored as part of the root level scheduler state.

Continuing to a block 508, a message is written into a message board associated with the root scheduler indicating a hole in the root level scheduler. The message may include the identity of the child scheduler whose packet reference is to be used to fill the hole in the root level scheduler. As discussed below, a hole-filling thread will be responsible for reading the message board and filling the hole at the root level scheduler. Proceeding to a block 510, the current minimum tag packet reference is sent from the root level scheduler to the transmit microblock for transmission.

Figure 6:
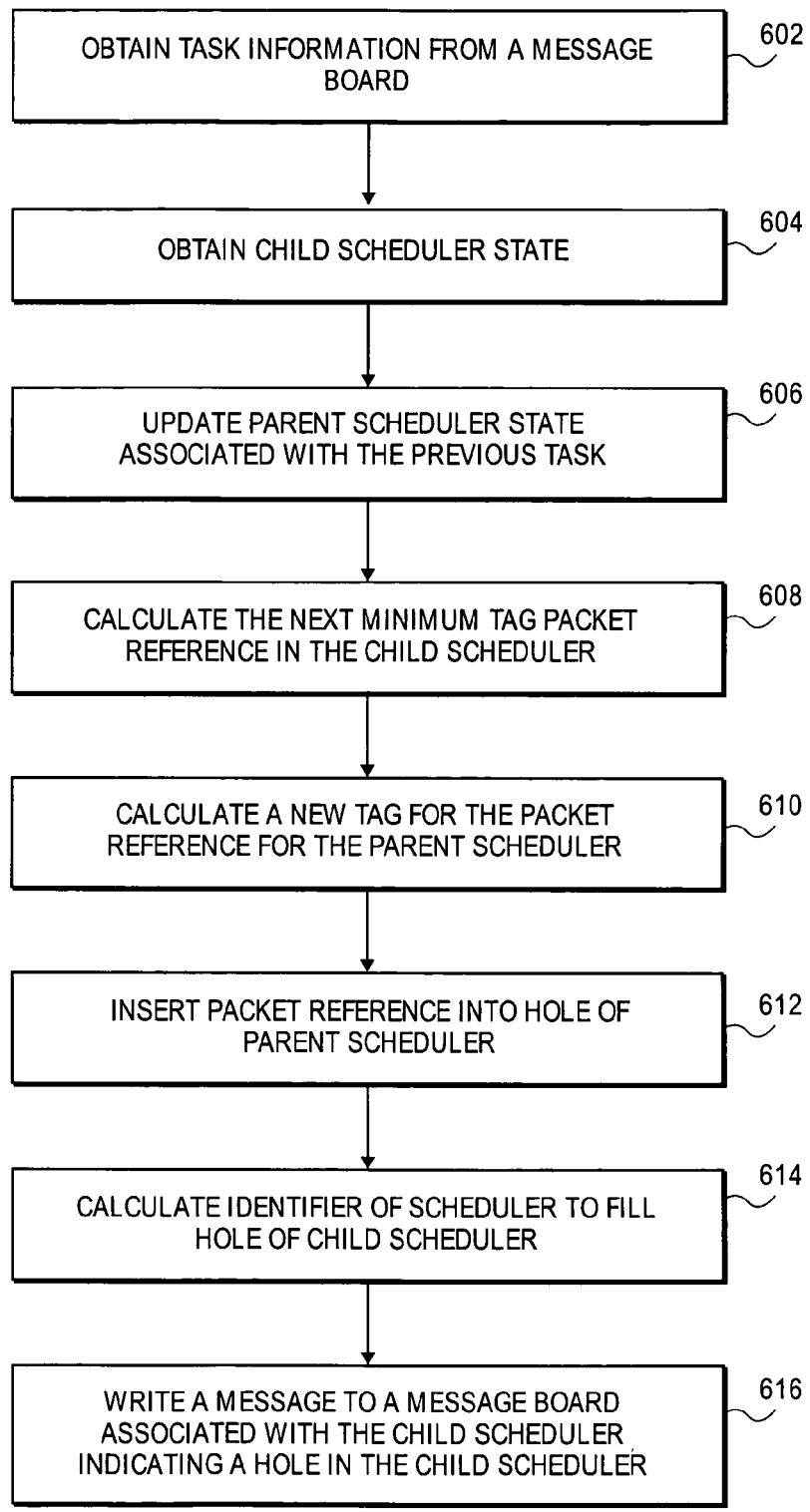
FIG. 6 is a flowchart illustrating one embodiment of the logic and operations of a hole-filling thread of a hierarchical packet scheduler in accordance with the teachings of the present invention.

Turning to FIG. 6, an embodiment of a flowchart 600 for a hole-filling thread is shown. In one embodiment, hole-filling threads serving the same level are executed in the same ME.

This enables the hole-filling threads to quickly exchange information, if necessary. In FIG. 4B, two hole-filling threads 472 serve the level of the scheduler that includes single-level scheduler 450. Two hole-filling threads 474 serve the level that includes parent scheduler 458.

Starting in a block 602, the hole-filling thread obtains hole-filling task information from a message board. Continuing to a block 604, the state of the child scheduler identified in the message is obtained. In this way, the hole-filling thread has the most up-to-date information regarding the child scheduler. Proceeding to a block 606, the state of the parent scheduler associated with a previous hole-filling task is updated. Continuing to a block 608, the next minimum tag packet reference in the child scheduler is calculated.

Proceeding to a block 610, a new tag is calculated for the packet reference for insertion into the parent scheduler. Each scheduler is autonomous and maintains its own virtual time. The virtual time of one scheduler is not related to the virtual time of another scheduler. When a packet reference is moved from a child scheduler to a parent scheduler, the tag of the packet reference is adjusted for the virtual time of the parent scheduler. The packet reference maintains its tag order in relation to the other packet references in the parent scheduler, but the time stamp value of the packet is changed from referencing the virtual time of the child scheduler to referencing the virtual time of the parent scheduler.

Continuing to a block 612, the packet is inserted into the hole of the parent scheduler. If the hole is in the head of the buffer and a packet reference is in the tail, then the hole-filling thread slides a packet reference from the tail to the head, and inserts a packet reference into the tail entry.

Proceeding to a block 614, an identifier of a scheduler to fill the hole of the child scheduler is calculated. Proceeding to a block 616, a message is written to a message board associated with the child scheduler indicating the child scheduler has a hole. As discussed above, a hole-filling thread serving the child scheduler's level will read the message and fill the hole of the child scheduler.

Figure 7:
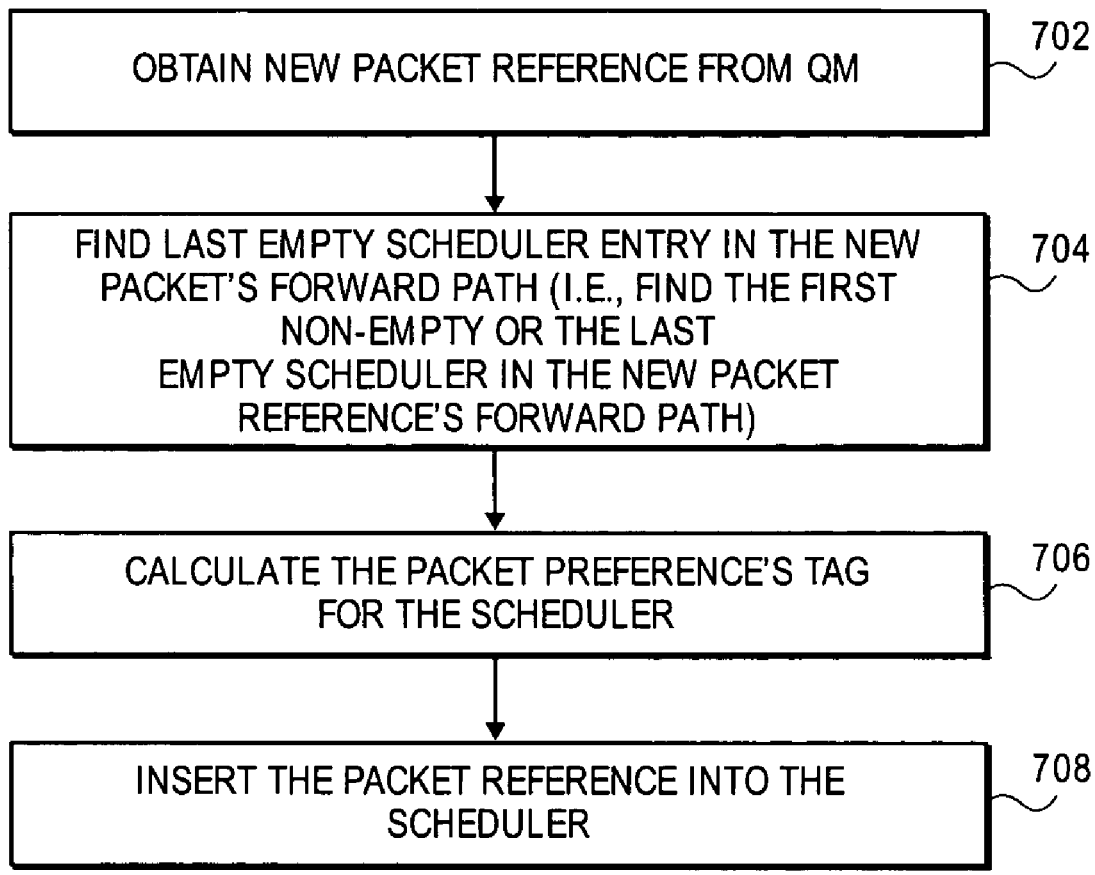
FIG. 7 is a flowchart illustrating one embodiment of the logic and operations of an enqueuing thread of a hierarchical packet scheduler in accordance with the teachings of the present invention.

Turning to FIG. 7, an embodiment of a flowchart 700 for an enqueuing thread is shown. Starting in a block 702, a new packet reference is obtained from the Queue Manager. Proceeding to a block 704, the last empty scheduler entry in the new packet reference's forward path from the leaf level to the root level is found. The term "scheduler entry" refers to a packet space to hold a packet reference as part of a buffer in a single-level scheduler. The last empty scheduler entry in a packet's forward path can be found either in the last empty or in the first non-empty scheduler in the packet's forward path, as discussed below. Thus, a packet reference does not have to be enqueued at the leaf level, but can be enqueue at an appropriate scheduler at any level in the packet references path through the hierarchical packet scheduler. Proceeding to a block 706, the packet reference's tag for the scheduler is calculated. The virtual time from the scheduler's state is accessed and used to set the packet reference's tag. Continuing to a block 708, the packet reference is inserted into the scheduler.

Reducing Memory Access Bandwidth Consumption

The multiple packet buffering discussed above may result in memory access bandwidth being used in its entirety in the hierarchical packet scheduler. When two packets are buffered at each entry in each scheduler, hole-filling threads may need to fetch state information associated with packet references at the heads and the tails of the buffers. During dequeuing or hole-filling operations, a minimum tag packet reference is selected and removed from the head of a buffer, and a packet reference at the tail of the same buffer is advanced to the head. To perform this operation, hole-filling threads may need to access the heads and tails of buffers concurrently.

One solution to this problem would be to design hole-filling threads in such a way that they only access the heads of the buffers of schedulers. Hole-filling threads simply select minimum tag packets from among the head-of-line packets of single-level schedulers. Hole-filing threads do not advance packets from the tails to the heads of their buffers. Packets at the tails of buffers are advanced to the head positions by the hole-filling threads serving the next level in the scheduling hierarchy. While this approach is simple, allowing hole-filing threads to operate on half the packets stored in single-level schedulers, it may corrupt the state of a single-level scheduler when hole-filling threads access the same scheduler concurrently.

State sharing problems may occur when hole-filling threads attempt to read the state of the same scheduler at the same time or when one thread attempts to read the state of a scheduler and another thread attempts to modify the state of the same scheduler. Synchronization problems may occur because threads have partial information about the state of the scheduler they access. When threads read the same scheduler state, the may identify a minimum tag packet reference in the same entry. In this case, one thread may remove the minimum tag packet reference from the head of the buffer of the scheduler before the other thread accesses the same scheduler state information. The second thread in this case cannot possibly know which packet should be advanced at the head of its buffer if this second thread reads only the heads of the buffers.

Another problem arises when one thread begins reading a portion of a scheduler state (e.g., only the heads and not the tails of buffers) while a hole-filling thread serving the next level begins updating the state of the same scheduler, concurrently. In this case, each thread may not be aware of the changes to the scheduler state being made by the other thread.

Embodiments described herein allow hole-filling threads to access half of the state information of single-level schedulers and yet safely share this information where and when needed. Hole-filling threads accessing the same scheduler state may be arranged so as to run in the same processing unit. Thus, each hole-filling thread may quickly access the locally stored state information known by its peer thread. In this way, each hole-filling thread may know whether its peer hole-filling thread has accessed the same scheduler. In an implementation on an Intel® IXP 2800 network processor, scheduler state information may be stored in Local Memory or processing unit registers.

Figure 8:
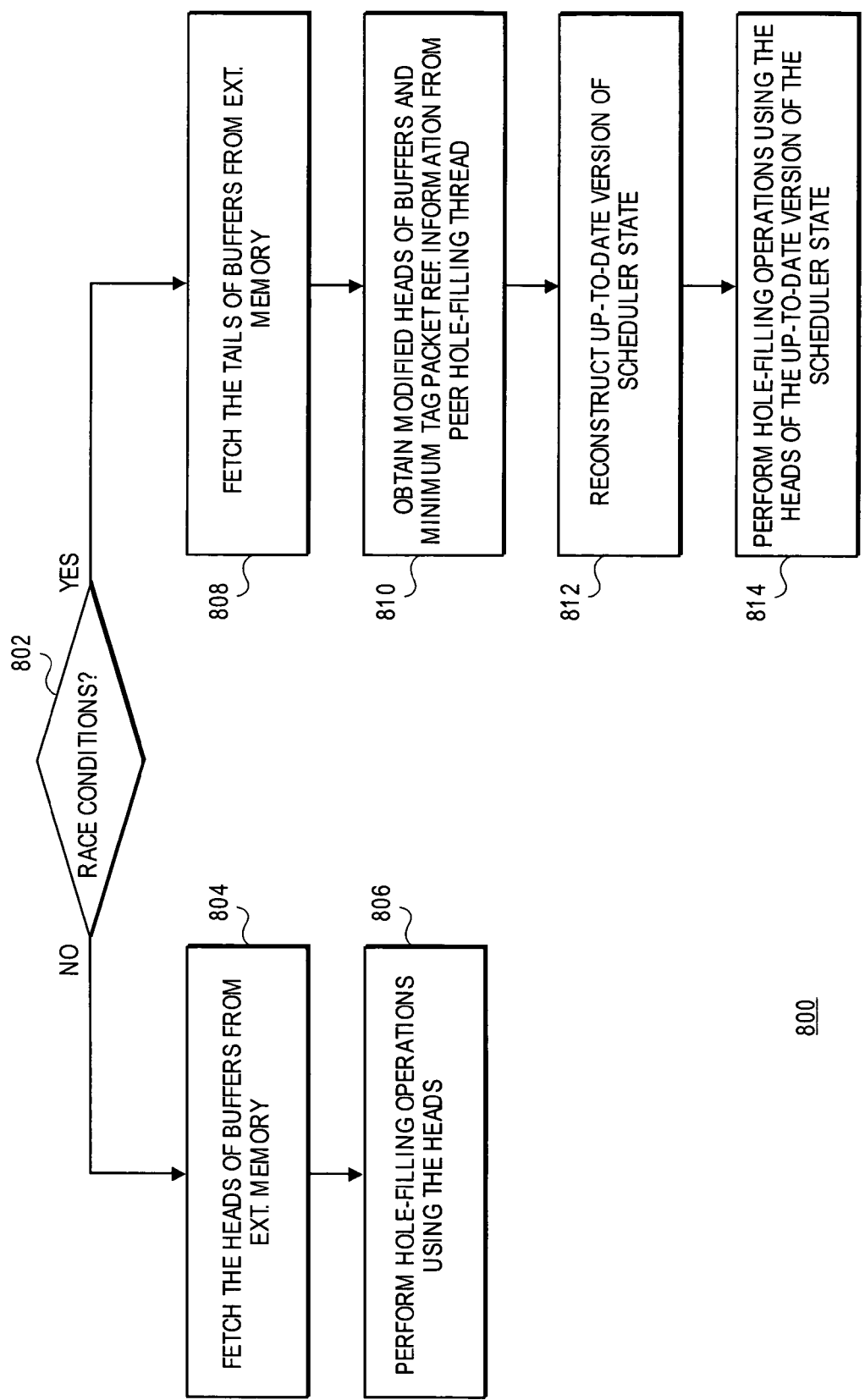
FIG. 8 is a flowchart illustrating one embodiment of the logic and operations to reduce memory access bandwidth consumption of a hierarchical packet scheduler in accordance with the teachings of the present invention.

An embodiment of the present invention is shown in flowchart 800 of FIG. 8. Starting in a decision block 802, the logic determines if "race conditions" are present. Race conditions refer to a situation where two threads are attempting to access the state of the same scheduler, potentially resulting in corruption of that state.

If race conditions are absent, then the logic proceeds to a block 804 where the hole-filling thread fetches the heads of buffers of the scheduler from external memory and, in a block 806, performs hole-filling using the heads of the buffers.

If race conditions exist, then the logic proceeds to a block 808 where the hole-filling thread fetches the tails of buffers from external memory, and in block 810, obtains the modified heads of buffers and minimum tag packet reference information from its peer thread. Continuing to a block 812, the hole-filling thread reconstructs an up-to-date version of the single-level scheduler state from the state information read from external memory and the state information obtained from its peer hole-filling thread. At block 814, the hole-filling thread performs hole-filling using the heads of the up-to-date version of the scheduler state.

In either case of race conditions, each thread reads half of the state of single level-schedulers. This state information may either be in the heads of buffers in the absence of race conditions or the tails of buffers in the presence of race conditions.

Case 1—Hole-filling Threads Serving the Same Level Reading the Same Single-level Scheduler Case 1 involves two hole-filling threads serving the same level reading the same scheduler state information. In an embodiment implemented on an IXP 2800, two threads serving the same level may begin reading the same scheduler state separated by 228 computer cycles. 228 computer cycles is the network processor headroom of an IXP 2800, where "headroom" describes the cycles a thread is allowed to spend processing a packet without violating the line rate forwarding requirement. In other embodiments, the number of cycles separating the instances where threads begin reading the state of the same scheduler may differ. If the hole-filling threads are not synchronized, they will identify the same minimum tag packet reference and attempt to remove the same packet reference from the same scheduler twice.

Turning to FIG. 9A, the problem of two hole-filling threads serving the same level accessing the same scheduler state information is illustrated. A hole-filling thread 1A and a hole-filling thread 1B are both serving a level of a hierarchical packet scheduler. FIG. 9A shows the activity of threads 1A and 1B over time (moving from left to right). Process time 902 shows the time that thread 1B begins reading the state of a scheduler S, shown at 920. Scheduler S is maintained in an external memory, such as external SRAM 306 and/or external DRAM 304. Also during processing time 902, thread 1B issues a read request 906 and a write request 908 to external memory. In general, during processing time, a thread is executing instructions using a processing unit of the network processor.

After process time 902, thread 1B goes to sleep as shown by sleep time 904. During this sleep time, write 906 to external memory is conducted. This write includes the completion of a hole-filling task where a message is written to a message board indicating a child scheduler on the next level has a hole that needs to be filled. Also during sleep time 904, read 908 to external memory is made to read a message for thread 1B to obtain new hole-filling tasking.

During sleep 904 of thread 1B, thread 1A wakes up to perform processing at processing time 910. During processing time 910, thread 1A begins reading the state of scheduler S. Thread 1A goes back to sleep during sleep time 916. During sleep time 916, write 912 and read 914 to external memory are conducted.

In FIG. 9A, thread 1A wakes up during the sleep time 904 of thread 1B. Thus, each thread is reading the same state of scheduler S. Consequently, the threads identify the same minimum tag packet reference and attempt to remove the same minimum tag packet reference from scheduler S twice.

Turning to FIG. 9B, an embodiment of the present invention is illustrated to handle this scheduler state race condition. At processing time 902, thread 1B begins reading the state of scheduler S. In particular, thread 1B reads the states of packet references at the heads of the buffers in scheduler S. Thread 1B then goes to sleep.

Thread 1A wakes up and begins processing time 910. During processing time 910, thread 1A reads the packets at the tails of the buffers of scheduler S. Since threads 1A and 1B are running in the same processing unit, threads 1A and 1B may share information regarding state information of scheduler S. Since thread 1A knows that thread 1B read the heads, thread 1A begins reading the tails of the buffers instead of the heads.

Thread 1A goes to sleep at the end of processing time 910 and then thread 1B wakes up for processing time 912. During processing time 912, thread 1B calculates a minimum tag packet reference amongst the packet references in the heads of the buffers. Thread 1B goes back to sleep and thread 1A wakes up for its processing time 914. Thread 1A obtains the state of the heads of buffers from thread 1B. Thread 1A also obtains the calculated minimum tag packet reference from thread 1B. Thread 1A uses this information to calculate an up-to-date version of the state of scheduler S from the heads read by thread 1B and the tails read by itself.

"Calculating an up-to-date version of the state of scheduler S" refers to the process of replacing the packet reference at the head of the entry where a minimum tag packet is found by thread 1B with the packet reference at the tail of the same entry. Also, the term "reconstructing an up-to-date version of the state of scheduler S" refers to the same process of calculating an up-to-date version of the state of scheduler S.

The thread 1A does not have to take the time to read the heads from external memory, but can use the head state information from thread 1B to construct an accurate local copy of the heads and the tails of the buffers of scheduler S, shown at 922. In one embodiment, this local copy of the state of scheduler S may be kept in Local Memory of a processing unit running threads 1A and 1B; while in another embodiment, this local copy may be stored in one or more registers of the processing unit running threads 1A and 1B. It will be appreciated that accessing the local copy of scheduler S may consume a few compute cycles, ranging from 3-10, while accessing external memory may take as many as 300 compute cycles.

In short, threads 1A and 1B fetch half of the state of scheduler S from external memory. Thread 1B reads the heads of buffers of scheduler S and thread 1A reads the tails. Because threads 1A and 1B run in the same processing unit, they can share state information of scheduler S.

Case 2—Hole-filling Threads from Adjacent Levels Acting on the Same Single-level Scheduler Case 2 addresses the situation where one thread reads from a data structure having scheduler state information and another thread on a different level writes to the same data structure. By the time the "reading" thread has calculated the minimum tag packet reference for scheduler S, it may not know that a new packet has been inserted into scheduler S, shown at 1020. This situation may occur when a hole-filling thread is reading the state of scheduler S and a hole-filling thread on the next level is filling a hole (i.e., writing) to scheduler S.

Turning to FIG. 10A, at processing time 1002, thread 1B issues a hole-filling request for scheduler S. In other words, thread 1B issues a write command to write to a message board that scheduler S has a hole that needs to be filled. A thread serving the next level will read the message and file the hole of scheduler S.

Thread 1B goes to sleep and thread 1A wakes up for its processing time 1004. During processing time 1004, thread 1A begins reading the state of scheduler S. Thread 1A obtains the heads of buffers of scheduler S. Thread 1A goes to back to sleep. During thread 1A's sleep time 1006, a hole-filling thread serving the next level updates the state of scheduler S by inserting a packet reference into scheduler S.

Thread 1A wakes up for processing time 1008 and is unaware of the changes in the state of scheduler S. Thread 1A may take action during processing time 1008, such as calculating the minimum tag packet reference, based on outdated state information of scheduler S.

Turning to FIG. 10B, an embodiment of the present invention is illustrated to handle this scenario. At processing time 1002, thread 1B issues a hole-filling request. Thread 1B goes to sleep and thread 1A wakes up for processing time 1004. Thread 1A obtains the heads of the buffers from thread 1A and also the information about the minimum tag packet reference. Thread 1A begins reading the tails of the buffers. Thread 1A then goes back to sleep. During thread 1A's sleep time 1006, a hole-filling thread serving the next level updates the state of scheduler S by inserting a packet reference into scheduler S as part of a hole-filling task.

Thread 1A wakes up for processing time 1008. Thread 1A performs the same actions as the hole-filling thread from the next level did on a local copy of scheduler S, shown at 1022. Thus, thread 1A reconstructs an up-to-date version of the state of scheduler S from the heads and tails.

Referring to FIG. 10C, an example of an embodiment of the present invention is illustrated. In the example of FIG. 10C, scheduler S is maintained in external SRAM, as shown at 1020. In this example, a number in the head or tail of a buffer is the identifier of a packet reference. This number should not be confused with a tag (i.e., timestamp) of a packet reference.

At processing time 1002, thread 11B reads the heads of scheduler S from external memory 1020. Thread 1B compares the packet references in the heads and determines that packet reference #34 is the minimum tag packet reference. Thread 1B removes packet reference #34 and uses it to fill a hole of a scheduler in the previous level. Further, since thread 1B has only read the heads of scheduler S, thread 1B does not know that packet reference #56 is in the tail of the buffer formerly storing packet reference #34. Thus, thread 1B does not know that packet reference #56 is to be slid from the tail to the head of the buffer.

At processing time 1004, thread 1A wakes up and obtains the heads of the buffers and also which buffer entry has the minimum tag packet reference. Thread 1A issues a request to read the tails from external SRAM 1020, and then goes back to sleep.

During thread 1A's sleep time 1006, a hole-filling thread on the next level pushes up a packet reference to fulfill the hole-filling request made by thread 1B during thread 1B's processing time 1002. The hole-filling thread on the next level updates the state of scheduler S by sliding packet reference #56 to the head of its buffer and inserting packet reference #42 into the tail.

Thread 1A wakes up at processing time 1008, and proceeds to make an up-to-date local copy 1022 of the state of scheduler S. At processing time 1004, thread 1A issued a read of the tails, thus, at processing time 1008, thread 1A knows that the tails formerly held packet reference #56. Thread 1A also knows what the heads looked like (obtained at processing time 1004). Thread 1A also knows which entry had the minimum tag packet reference and that this head entry has become an unknown. Thus, by combining the tails with the heads with the knowledge of an unknown head entry, thread 1A reconstructs an up-to-date state of the heads of scheduler S in a local copy.

By having an up-to-date local copy of scheduler S, thread 1A now can find the minimum tag packet reference in the heads and push this packet reference up to the previous level to fulfill a hole-filling task of thread 1A. Thread 1A does need an up-to-date local copy of the tails to perform hole-filling. Again, in the embodiments of FIGS. 10B and 10C, the hole-filling threads only have to read half of the state of a scheduler S. One thread reads the heads while the other thread reads the tails.

In the embodiments herein, both threads 1A and 1B are both performing hole-filling operations. While in the above examples discussed thread 1A obtains information from thread 1B to create an up-to-date local copy of the scheduler S, it will be understood that thread 1B may also be obtain scheduler state information from thread 1A.

Embodiment of Combined Flowchart for Resolving Case 1 and Case 2

Figure 11:
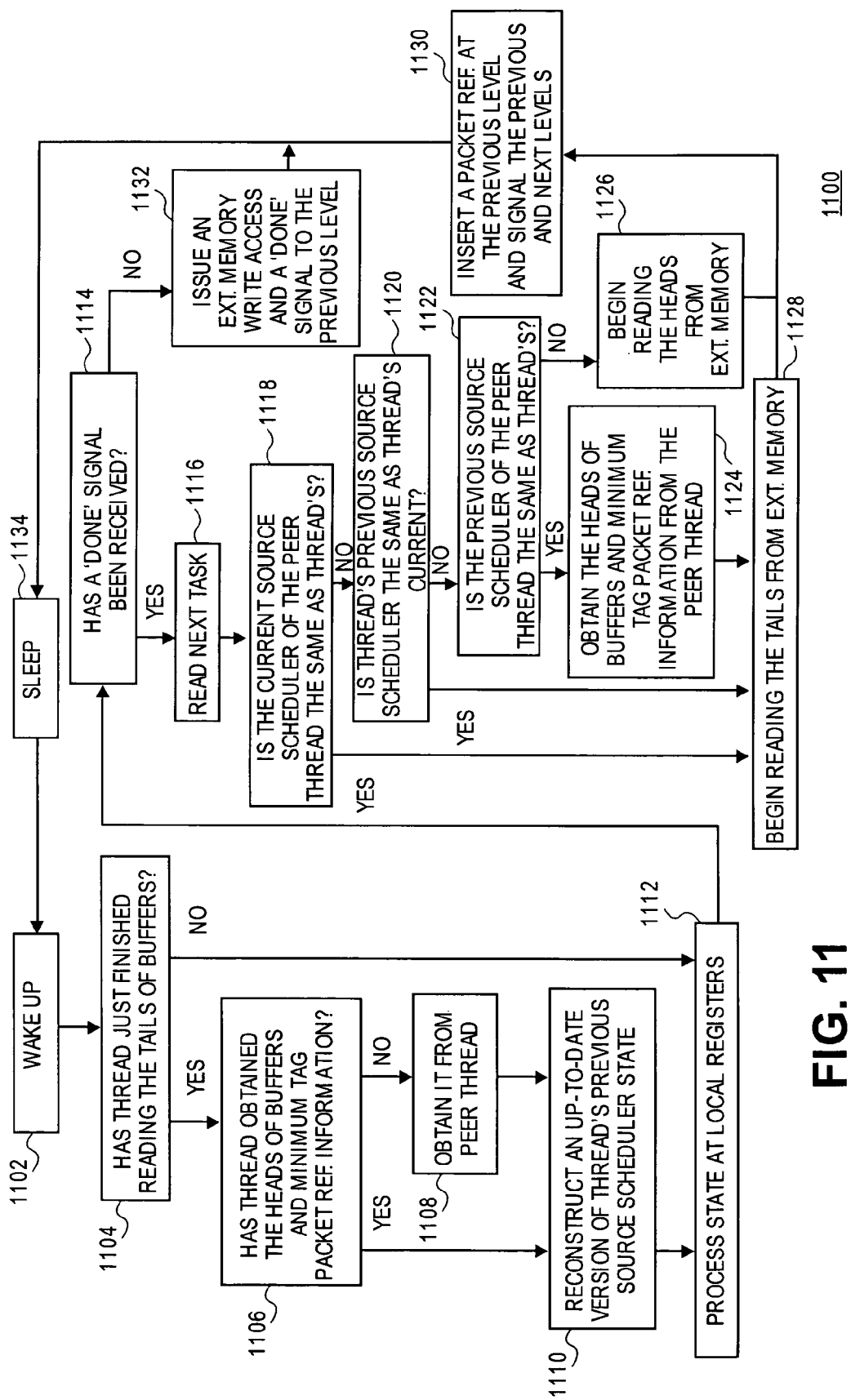
FIG. 11 is a flowchart illustrating one embodiment of the logic and operations to reduce memory access bandwidth consumption of a hierarchical packet scheduler in accordance with the teachings of the present invention.

Referring to FIG. 11, a flowchart 1100 illustrating one embodiment of the logic and operations to reduce memory access bandwidth consumption of a hierarchical packet scheduler is shown. It will be understood the flowchart 1100 is an implementation embodiment of the logic and operations of flowchart 800.

Flowchart 1100 assumes each buffer has two entries, a head and a tail. Flowchart 1100 also assumes each level of the hierarchical packet scheduler is served by two hole-filling threads, except for the root level which is served by one hole-filling thread. The "peer thread" of a hole-filling thread is the other hole-filling thread running in the same processing unit. For example, in FIG. 9B, thread 1B is the peer thread of thread 1A. Similarly, thread 1A is the peer thread of thread 1B. In an implementation on the IXP2800 network processor, embodiments of the present invention reduce the memory access bandwidth to 50% of its total capacity.

Flowchart 1100 introduces the terms "previous source scheduler" of the hole-filling thread, and the "current source scheduler" of the hole-filling thread that are defined herein as follows. Every time a hole-filling thread wakes up, it is associated with two schedulers. The "previous source scheduler" of the hole-filling thread is the scheduler who's state was just read from an external memory and is about to complete processing. The "current source scheduler" of the hole-filling thread is the scheduler who's state is about to be read from external memory for performing a hole-filling task by the hole-filling thread.

Starting in a block 1102, a hole-filling thread wakes up. Proceeding to a decision block 1104, the logic determines if the hole-filling thread has just finished reading the tails of buffers. If the thread has just read the tails, then the thread knows it is in a race condition and needs to create an up-to-date local copy of the scheduler. If the answer is no, then the logic proceeds to a block 1112 to process state at local registers (discussed below).

If the answer to decision block 1104 is yes, then the logic continues to a decision block 1106 to determine if the thread has obtained the heads of buffers and the minimum tag packet reference information. If the answer is no, then the logic proceeds to a block 1108 to obtain information about the heads of buffers and a minimum tag packet reference from the peer thread, and then to a block 1110. If the answer to decision block 1106 is yes, then the logic proceeds to block 1110.

In block 1110, the hole-filling thread constructs an up-to-date version of the thread's previous source scheduler state. The logic then proceeds to block 1112 to process the scheduler state at local registers of the processing unit executing the hole-filling thread. Processing scheduler state at local registers includes determining a minimum tag packet reference.

After block 1112, the logic continues to a decision block 1114 to determine if a done signal has been received by the hole-filling thread from the next level. The "done signal"

refers to a message indicating that a hole-filling thread serving a next level has completed servicing a hole-filling request. In one embodiment, a done signal is one of the signals used by the microengines of the IXP2800 network processor for inter-thread communication. In other embodiments, other types of inter-thread communication may be used for implementing done signals.

If the answer to decision block 1114 is no, then the logic continues to a block 1132. At block 1132, a write access to external memory is issued by the hole-filling thread and a done signal is issued to the previous level. The done signal tells the hole-filling threads in the previous level that the hole-filling thread has finished updating the state of the scheduler. After block 1132, the logic proceeds to a block 1134 where the hole-filling thread enters a sleep time.

If the answer to decision block 1114 is yes, then the logic continues to a block 1116 to read the next hole-filling task from a message board. The logic proceeds to a decision block 1118 to determine if the current source scheduler of the peer thread is the same current source scheduler of the hole-filling thread. This situation is analogous to the situation of FIG. 9B.

If the answer to decision block 1118 is yes, then the logic proceeds to a block 1128 to begin reading the tails from external memory. In this situation, the hole-filling thread will sleep and when it wakes, the hole-filling thread will obtain the heads and the minimum tag packet reference from the peer thread (see block 1108). The hole-filling thread then reconstructs an up-to-date version of the state of its previous source scheduler (see block 1110).

If the answer to decision block 1118 is no, then the logic proceeds to a decision block 1120 to determine if the thread's previous source scheduler is the same as the thread's current source scheduler. If the answer to decision block 1120 is yes, then the logic continues to block 1128. In this situation, then the hole-filling thread reads the tails from external memory, sleeps, and then reconstructs an up-to-date version of the scheduler state (see block 1110).

If the answer to decision block 1120 is no, then the logic proceeds to a decision block 1122 to determine if the previous source scheduler of the peer thread is the same as the thread's previous source scheduler.

If the answer to decision block 1122 is yes, then the logic continues to a block 1124 to obtain the heads of buffers and the minimum tag packet reference information from the peer thread. In this situation, the hole-filling thread will read the tails from external memory and then sleep. When the hole-filling thread wakes up, it will reconstruct an up-to-date version of the state of its previous source scheduler (see block 1110).

If the answer to decision block 1122 is no, then the logic proceeds to a block 1126 to begin reading the heads from external memory. Block 1126 is the situation where no race conditions exist. The hole-filling thread reads the heads of buffers from external memory. The hole-filling thread in this case will sleep and when it wakes again will use the obtained head information to calculate a minimum tag packet reference. After block 1126, the logic continues to a block 1130 (discussed below).

As described above, at block 1128, the thread begins reading the tails from external memory. The logic then continues to block 1130 to insert a packet reference into the scheduler at the previous level and signal the previous and next levels that the hole-filling thread has completed its hole-filling task.

From block 1130, the logic continues to block 1134 where the hole-filling thread enters a sleep time. When the sleep time is completed, the hole-filling thread wakes up, as shown by block 1102.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising:
   maintaining a hierarchical packet scheduler, wherein the hierarchical packet scheduler includes one or more levels, each level including one or more schedulers, wherein each scheduler includes at least one buffer, each buffer including a head entry and a tail entry, each of the head entry and of the tail entry capable of storing a packet reference, wherein one or more threads serve each level, wherein each of the one or more threads is dedicated to a single level; and
   performing scheduling operations at each scheduler of the hierarchical packet scheduler by reading a portion of scheduler state from external memory, wherein reading the portion of scheduler state includes reading the head entry or the tail entry, wherein performing scheduling operations includes performing hole-filling operations by a hole-filling thread, wherein hole-filling operations comprise:
      removing a packet reference from a child scheduler of a parent scheduler, wherein the removed packet reference is the minimum tag reference packet from among the packet references in the head entries of buffers of the child scheduler;
      sliding another packet reference from a tail entry to a head entry of a buffer of the parent scheduler; and
      inserting the packet reference into the tail entry of the parent scheduler.

2. The method of claim 1, further comprising:
   if another hole-filling thread has not accessed the parent scheduler, then performing hole-filling operations by the hole-filling thread includes:
   fetching the heads of buffers from external memory; and
   performing hole-filling operations using the fetched heads of buffers.

3. The method of claim 1, further comprising:
   if another hole-filling thread has accessed the parent scheduler, then performing hole-filling operations by the hole-filling thread includes:
   fetching the tails of buffers from external memory;
   obtaining modified heads of buffers and minimum tag packet reference information from a peer hole-filling thread, wherein the peer hole-filling thread executes in the same processing unit as the hole-filling thread;
   reconstructing an up-to-date version of the scheduler state using the fetched tails and the obtained modified heads; and
   performing hole-filling operations using the up-to-date version of the scheduler state.

4. The method of claim 3 wherein reconstructing the up-to-date version of the scheduler state comprises maintaining the up-to-date version of the scheduler state in a storage unit of a processing unit executing the hole-filling thread.

5. The method of claim 1 wherein performing scheduling operations comprises:
enqueuing a new packet reference into the hierarchical packet scheduler; and
dequeuing a packet reference from a root level scheduler of the hierarchical packet scheduler, the dequeued packet reference to be forwarded to a transmitter.

6. The method of claim 5 wherein packet references are dequeued from the root level scheduler at line rate.

7. The method of claim 1 wherein hole-filling threads serving the same level of the hierarchical packet scheduler execute in the same processing unit.

8. The method of claim 1 wherein external memory comprises memory coupled to a network processor performing the scheduling operations.

9. An article of manufacture comprising:
a machine-accessible storage medium including a plurality of instructions which when executed perform operations comprising:
maintaining a hierarchical packet scheduler, wherein the hierarchical packet scheduler includes one or more levels, each level including one or more schedulers, wherein each scheduler includes at least one buffer, each buffer including a head entry and a tail entry, each of the head entry and the tail entry capable of storing a packet reference; and
performing scheduling operations at each scheduler of the hierarchical packet scheduler by reading one of the head entry and the tail entry from external memory, wherein performing scheduling operations comprises:
performing hole-filling operations by a hole-filling thread, wherein hole-filling operations include:
removing a packet reference from a head entry of a child scheduler, the packet reference being the minimum tag packet reference of all the packet references in the heads of the child scheduler; and
sliding another packet reference from the tail entry to the head entry of a buffer of a parent scheduler of the child scheduler; and
inserting the packet reference into the tail entry of the buffer of the parent scheduler.

10. The article of manufacture of claim 9 wherein execution of the plurality of instructions further perform operations comprising:
if another hole-filling thread has not accessed the parent scheduler, then performing hole-filling operations by the hole-filling thread includes:
fetching the heads of buffers from external memory; and
performing hole-filling operations using the fetched heads of buffers.

11. The article of manufacture of claim 9 wherein execution of the plurality of instructions further perform operations comprising:
if another hole-filling thread has accessed the parent scheduler, then performing hole-filling operations by the hole-filling thread includes:
fetching the tails of buffers from external memory;
obtaining the modified heads of buffers and minimum tag packet reference information from a peer hole-filling thread, wherein the peer hole-filling thread executes in the same processing unit as the hole-filling thread;
reconstructing an up-to-date version of the scheduler state using the fetched tails and the obtained modified heads; and
performing hole-filling operations using the up-to-date version of the scheduler state.

12. The article of manufacture of claim 11 wherein obtaining the modified heads of buffers includes reading at least one of a register and a local memory of the same processing unit.

13. The article of manufacture of claim 11 wherein reconstructing the up-to-date version of the scheduler state comprises maintaining the up-to-date version of the scheduler state in a local copy stored in a storage unit of the same processing unit executing the hole-filling thread.

14. The article of manufacture of claim 9 wherein performing scheduling operations comprises:
enqueuing a new packet reference into the hierarchical packet scheduler; and
dequeuing a packet reference from a root level scheduler of the hierarchical packet scheduler, wherein packet references are dequeued from the root level scheduler at line rate.

15. The article of manufacture of claim 9 wherein hole-filling threads serving the same level of the hierarchical packet scheduler execute in the same processing unit.

16. A system, comprising:
a network processor including one or more processing units;
a Static Random Access Memory (SRAM) coupled to the network processor, the SRAM external to the network processor; and
a storage device communicatively coupled to the network processor, the storage device having stored a plurality of instructions which when executed by the network processor perform operations comprising:
maintaining a hierarchical packet scheduler, wherein the hierarchical packet scheduler includes one or more levels, each level including one or more schedulers, wherein each scheduler includes at least one buffer, each buffer including a head entry and a tail entry, each of the head entry and the tail entry capable of storing a packet reference; and
performing scheduling operations at each scheduler of the hierarchical packet scheduler by reading a portion of scheduler state from SRAM, wherein reading the portion of scheduler state includes reading the head entry or the tail entry,
wherein performing scheduling operations comprises:
performing hole-filling operations by a hole-filling thread, wherein hole-filling operations include:
removing a packet reference from a head entry of a child scheduler, wherein the removed packet reference is the minimum tag packet reference from among the packet references in the head entries of buffers of the child scheduler; and
sliding another packet reference from the tail entry to the head entry of a buffer of a parent scheduler of the child scheduler; and
inserting the packet reference into the tail entry of the buffer of the parent scheduler.

17. The system of claim 16 wherein execution of the plurality of instructions further perform operations comprising:
if another hole-filling thread has not accessed the parent scheduler, then performing hole-filling operations by the hole-filling thread includes:
fetching the heads of buffers from SRAM; and
performing hole-filling operations using the fetched heads of buffers.

18. The system of claim 16 wherein execution of the plurality of instructions further perform operations comprising:
if another hole-filling thread has accessed the parent scheduler, then performing hole-filling operations by the hole-filling thread includes:

fetching the tails of buffers from SRAM;
obtaining the modified heads of buffers and minimum tag packet reference information from a peer hole-filling thread, wherein the peer hole-filling thread executes in the same processing unit as the hole-filling thread;
reconstructing an up-to-date version of the scheduler state using the fetched tails and the obtained modified heads; and
performing hole-filling operations using the up-to-date version of the scheduler state.

19. The system of claim 18 wherein obtaining the modified heads of buffers includes reading at least one of a register and a local memory of the same processing unit.

20. The system of claim 18 wherein reconstructing the up-to-date version of the scheduler state comprises maintaining the up-to-date version of the scheduler state in a local copy in a storage unit of the same processing unit executing the hole-filling thread.

21. The system of claim 16 wherein performing scheduling operations comprises:
enqueuing a new packet reference into the hierarchical packet scheduler; and
dequeuing a packet reference from a root level scheduler of the hierarchical packet scheduler, wherein packet references are dequeued from the root level scheduler at line rate.

22. The system of claim 16 wherein hole-filling threads serving the same level of the hierarchical packet scheduler execute in the same processing unit of the network processor.

* * * * *